United States Patent
Bhattad et al.

(10) Patent No.: US 9,497,732 B2
(45) Date of Patent: Nov. 15, 2016

(54) METHOD AND APPARATUS FOR COMMUNICATING IN A DOMINANT INTERFERENCE SCENARIO

(71) Applicant: QUALCOMM Incorporated, San Diego, CA (US)

(72) Inventors: Kapil Bhattad, San Diego, CA (US); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 292 days.

(21) Appl. No.: 13/692,733

(22) Filed: Dec. 3, 2012

(65) Prior Publication Data

US 2013/0094427 A1  Apr. 18, 2013

Related U.S. Application Data

(63) Continuation of application No. 12/499,425, filed on Jul. 8, 2009, now Pat. No. 8,428,016.

(60) Provisional application No. 61/080,056, filed on Jul. 11, 2008.

(51) Int. Cl.
*H04W 72/00* (2009.01)
*H04L 1/00* (2006.01)
(Continued)

(52) U.S. Cl.
CPC .......... *H04W 72/005* (2013.01); *H04L 1/0003* (2013.01); *H04L 1/0009* (2013.01);
(Continued)

(58) Field of Classification Search
CPC .................................................. H04W 72/005
USPC ........ 370/329, 252, 312; 455/443, 444, 450, 455/464, 509, 41.1-3, 703, 63.3, 67.11-13, 455/206
See application file for complete search history.

(56) References Cited

U.S. PATENT DOCUMENTS 7,308,265 B2 * 12/2007 Mun ............................ 455/443
7,903,628 B2    3/2011 Akkarakaran et al.
(Continued)

FOREIGN PATENT DOCUMENTS

EP    1313338 A1    5/2003
JP    2005512426 A    4/2005
(Continued)

OTHER PUBLICATIONS

3GPP RAN1: "3rd Generation Partnership Project; Technical Specification Group Radio Access Network; Evolved Universal Terrestrial Radio Access (E-UTRA) ; Physical layer procedures(Release 8)" 3GPP TS 36.213 V8.3.0, [Online] vol. 36.213, No. V8.3.0, May 1, 2008, pp. 1-45, XP002554705 Sophia Antipolis Retrieved from the Internet: URL:http://www.3gpp.org/ftp/Specs/archive/36-series/36.211/36213-830.zip> [retrieved on Nov. 9, 2009] p. 34, paragraph 8—p. 42, paragraph 9.1.2.
(Continued)

*Primary Examiner* — Cong Tran
(74) *Attorney, Agent, or Firm* — Nerrie M. Zohn

(57) ABSTRACT

Techniques for supporting communication in a dominant interference scenario are described. A user equipment (UE) may communicate with a first base station and may observe high interference from and/or may cause high interference to a second base station. In one design, the first base station may use a first frequency band, which may overlap at least partially with a second frequency band for the second base station and may further extend beyond the second frequency band. The first base station may send at least one synchronization signal and a broadcast channel in a center portion of the first frequency band for use by UEs to detect the first base station. The second frequency band may be non-overlapping with the center portion of the first frequency band. The first base station may also communicate with at least one UE on the first frequency band.

51 Claims, 14 Drawing Sheets

(51) Int. Cl.
  *H04L 5/00* (2006.01)
  *H04W 48/12* (2009.01)
  *H04W 72/08* (2009.01)
  *H04W 84/04* (2009.01)

(52) U.S. Cl.
  CPC ........... *H04L5/0007* (2013.01); *H04L 5/0053* (2013.01); *H04L 5/0073* (2013.01); *H04W 48/12* (2013.01); *H04W 72/08* (2013.01); *H04W 84/045* (2013.01)

(56) References Cited

U.S. PATENT DOCUMENTS

| | | | |
|---|---|---|---|
| 7,986,959 | B2 | 7/2011 | Malladi et al. |
| 8,428,016 | B2 | 4/2013 | Bhattad et al. |
| 8,619,706 | B2 * | 12/2013 | Kalhan ......................... 370/331 |
| 2002/0173272 | A1 * | 11/2002 | Liang et al. ................... 455/63 |
| 2003/0125039 | A1 * | 7/2003 | Lachtar et al. ............... 455/453 |
| 2007/0070938 | A1 * | 3/2007 | Hori et al. ..................... 370/328 |
| 2007/0097939 | A1 * | 5/2007 | Nylander et al. ............. 370/338 |
| 2007/0099567 | A1 * | 5/2007 | Chen et al. ................... 455/41.2 |
| 2008/0161013 | A1 | 7/2008 | Friman |
| 2008/0161025 | A1 | 7/2008 | Imai |
| 2008/0316959 | A1 | 12/2008 | Bachl et al. |
| 2009/0082064 | A1 * | 3/2009 | Li et al. ...................... 455/562.1 |
| 2009/0124224 | A1 * | 5/2009 | Hildebrand et al. ......... 455/150.1 |
| 2009/0196266 | A1 * | 8/2009 | Wu et al. ..................... 370/338 |
| 2009/0201861 | A1 | 8/2009 | Kotecha |
| 2009/0257356 | A1 | 10/2009 | Frederiksen et al. |
| 2010/0165862 | A1 | 7/2010 | Nylander et al. |
| 2010/0265867 | A1 | 10/2010 | Becker et al. |

FOREIGN PATENT DOCUMENTS

| | | |
|---|---|---|
| JP | 2008535398 | 8/2008 |
| WO | 9709835 A1 | 3/1997 |
| WO | 2006107698 A2 | 10/2006 |

OTHER PUBLICATIONS

3GPP RAN1: "3rd Generation Partnership Project; Technical Specification Group Radio Access Network; Evolved Universal Terrestrial Radio Access (E-UTRA); Physical Channels and Modulation (Release 8)" 3GPP TS 36.211 V8.3.0, [Online] vol. 3GPP TS 36.211, No. V8.3.0, May 1, 2008, pp. 1-77, XP002554704 Sophia Antipolis Retrieved from the Internet: URL: http://www.3gpp.org/ftp/Specs/archive/36-series/36.211/36211-830.zip> [retrieved on Jun. 22, 2009] cited in the application, p. 11, paragraph 5—p. 72, paragraph 6.13.

Huawei: "Carrier aggregation in Advanced E-UTRA" 3GPP Draft; R1-082448, 3rd Generation Partnership Project (3GPP), Mobile Competence Centre ; 650, Route Des Lucioles ; F-06921 Sophia-Antipolis Cedex ; France, vol . RAN WG1, no. Warsaw, Poland; 20080625, Jun. 25, 2008, XP050110721 p. 1, line 24—line 27 p. 2, line 17—line 19 p. 3, line 38—line 4--5.

International Search Report and Written Opinion—PCT/US2009/050293—ISA/EPO—Mar. 19, 2010.

Qualcomm Europe: "Advantages of synchronous network operation for LTE-A ", 3GPP TSG-RAN WG1 #53bis R1-082555,Jun. 30, 2008,URL,http://www.3gpp.org/ftp/tsg_ran/WG1_RL1/TSGR1_53b/Docs/R1-082555.zip.

Qualcomm Europe: Carrier Aggregation in Heterogeneous Networks 3GPP Draft; R1090357, 3rd Generation Partnership Project (3GPP), Mobile Competence Centre; 650, Route Des Lucioles; F-06921 Sophia-Antipolis Cedex; France, no. Ljubljana; 20090108, Jan. 8, 2009, XP050318263 the whole document.

Qualcomm Europe: "New Interference Scenarios in LTE-Advanced" 3GPP Draft; R1082556, 3rd Generation Partnership Project (3GPP), Mobile Competence Centre; 650, Route Des Lucioles; F-06921 Sophia-Antipolis Cedex; France, vol. RAN WG1, no. Warsaw, Poland; 20080625, Jun. 25, 2008, XP050110817 [retrieved on Jun. 25, 2008] p. 1, paragraph 2.2—p. 2.

Qualcomm Europe: Notion of Anchor Carrier in LTE-A 3GPP Draft; R1-090356, 3rd Generation Partnership Project (36PP), Mobile Competence Centre ; 650, Route Des Lucioles ; F-06921 Sophia-Antipolis Cedex ; France, no Ljubljana; 20090108, Jan. 8, 2009, XP050318262 the whole document.

Qualcomm Europe ,Vodafone: "Evaluation methodology for LTE-A—Heterogeneous networks ", 3GPP TSG-RAN WG1 #53bis R1-082554,Jun. 30, 2008,URL,http://www.3gpp.org/ftp/tsg_ran/WG1_RL1/TSGR1_53b/Docs/R1-082554.zip.

Spectrum Arrangement to Enable Co-Channel Deployment of Home Nodebs, 3Gpp TSG-RAN WG4 Meeting #44, Athens, Greece, Aug. 20-24, 2007.

Taiwan Search Report—TW098123466—TIPO—Mar. 24, 2013.

Nortel: "Spectrum Arrangement to enable Co-channel deployment of Home NodeBs", 3GPP Draft; R4-071494, 3rd Generation Partnership Project (3GPP), Mobile Competence Centre; 650, Route Des Lucioles; F-06921 Sophia-Antipolis Cedex; France, vol. RAN WG4, no. Athens, Greece; 20070827, Aug. 27, 2007, XP050177930, [retrieved on Aug. 27, 2007].

* cited by examiner

METHOD AND APPARATUS FOR COMMUNICATING IN A DOMINANT INTERFERENCE SCENARIO

The present application is a Continuation Application of U.S. application Ser. No. 12/499,425, filed Jul. 8, 2009, entitled: METHOD AND APPARATUS FOR COMMUNICATING IN A DOMINANT INTERFERENCE SCENARIO, now U.S. Pat. No. 8,428,016; which claims priority to provisional U.S. Application Ser. No. 61/080,056, filed Jul. 11, 2008, entitled "SUPPORTING RESTRICTED ASSOCIATION IN LTE USING FDM," assigned to the assignee hereof and incorporated herein by reference.

BACKGROUND

I. Field

The present disclosure relates generally to communication, and more specifically to techniques for supporting communication in a wireless communication network.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

Techniques for supporting communication in a dominant interference scenario are described herein. A UE may communicate with a first base station and may observe high interference from and/or may cause high interference to a second base station. The first base station may be a macro base station, and the second base station may be a femto base station with restricted access. The first and/or second base station may also be base stations of other types.

In an aspect, communication in a dominant interference scenario may be supported by having different base stations operate on different frequency bands. In one design, a first base station may use a first frequency band, which may overlap at least partially with a second frequency band for a second base station and may further extend beyond the second frequency band. The first base station may broadcast information indicative of the first frequency band for the first base station and possibly the second frequency band for the second base station.

In one design, the first base station may use the first frequency band for communication on the downlink. The first base station may send at least one synchronization signal and a broadcast channel in a center portion of the first frequency band, which may be non-overlapping with the second frequency band. The first base station may also send multiple transmissions of a control channel across the first frequency band to allow UEs to receive at least one transmission of the control channel without interference from the second base station. The first base station may also send a control channel and/or a data channel to at least one UE in a portion of the first frequency band that is non-overlapping with the second frequency band.

In another design, the first base station may use the first frequency band for communication on the uplink. The first base station may receive a control channel sent by at least one UE in a control region of the first frequency band, which may be non-overlapping with the second frequency band. The first base station may also receive a data channel sent by the at least one UE in a data region of the first frequency band, which may be assignable for data transmission on the uplink and may be non-overlapping with the second frequency band. The control region may be non-overlapping with the data region.

Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc.

UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
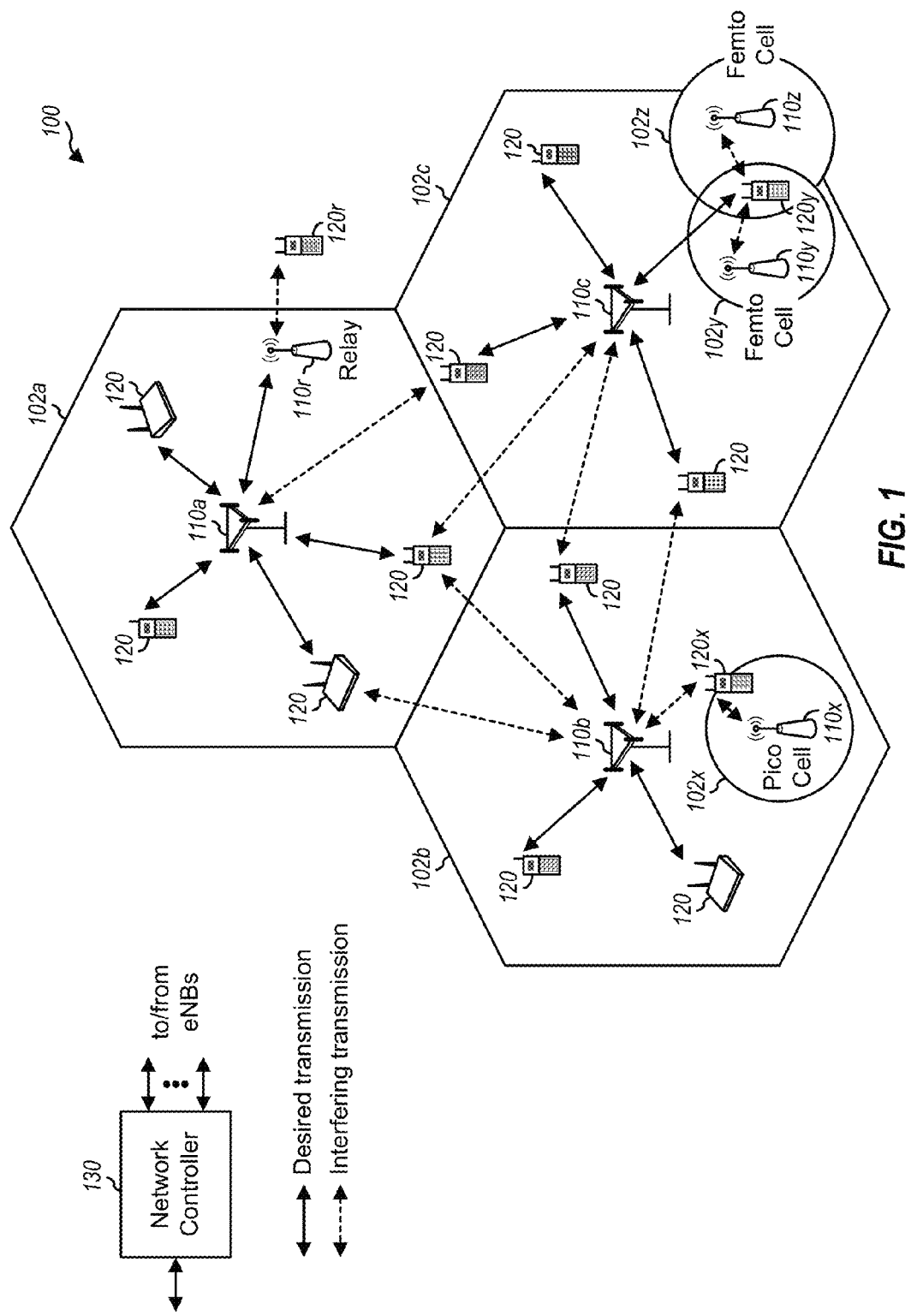
FIG. 1 shows a wireless communication network.

FIG. 1 shows a wireless communication network 100, which may be an LTE network. Wireless network 100 may include a number of evolved Node Bs (eNBs) 110 and other network entities. An eNB may be a station that communicates with the UEs and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, eNBs 110a, 110b and 110c may be macro eNBs for macro cells 102a, 102b and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

Wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

Wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in wireless network 100. For example, macro eNBs may have a high transmit power level (e.g., 20 Watts) whereas pico eNBs, femto eNBs and relays may have a lower transmit power level (e.g., 1 Watt).

Wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. Network controller 130 may communicate with eNBs 110 via a backhaul. eNBs 110 may also communicate with one another, e.g., directly or indirectly via wireless or wireline backhaul.

UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
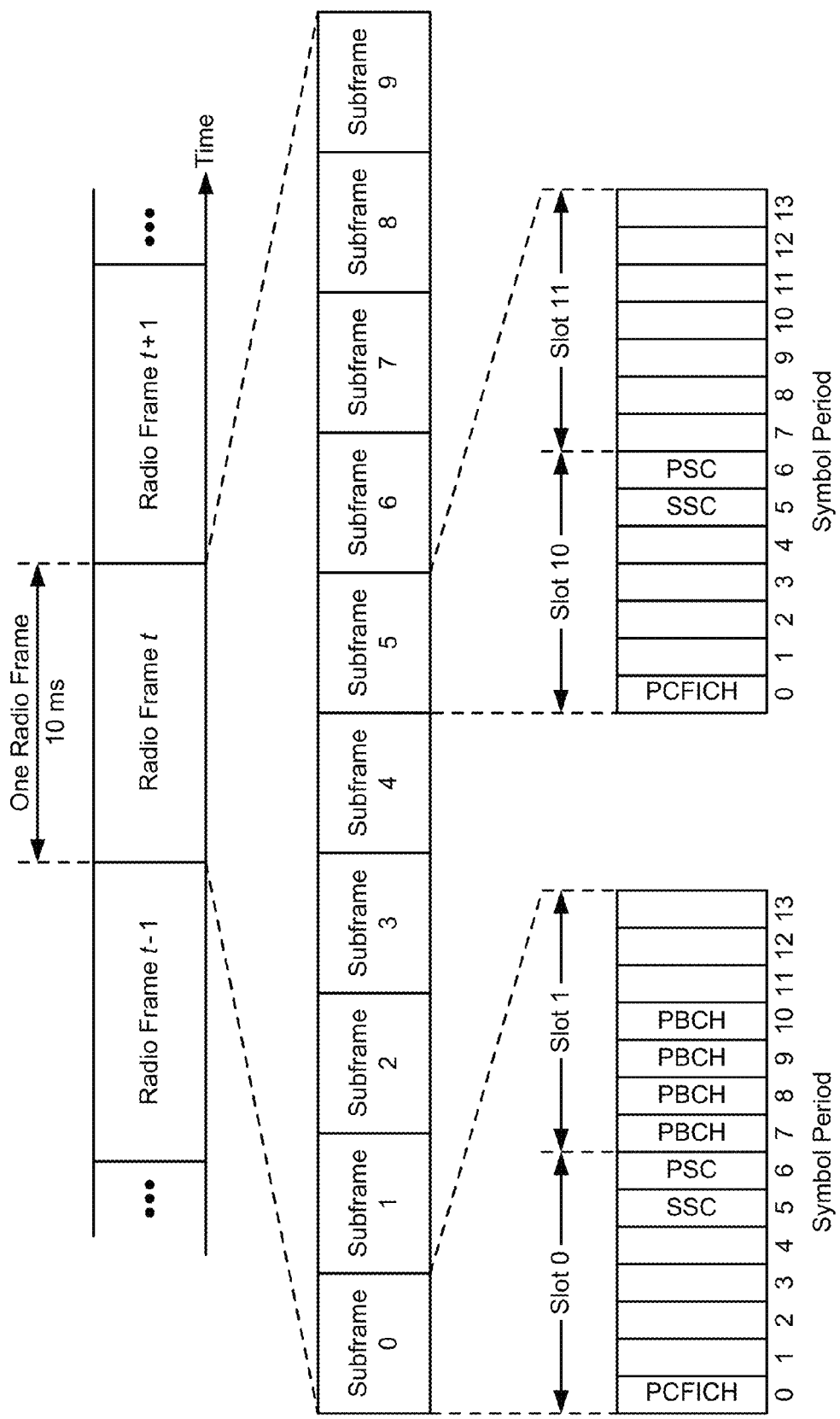
FIG. 2 shows an exemplary frame structure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic retransmission (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, pathloss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower pathloss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the pathloss for eNB 110x is lower than the pathloss for macro eNB 110b. This may result in less interference to the wireless network for a given data rate for UE 120x.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the received power of the eNB at a UE (and not based on the transmit power level of the eNB).

Figure 3:
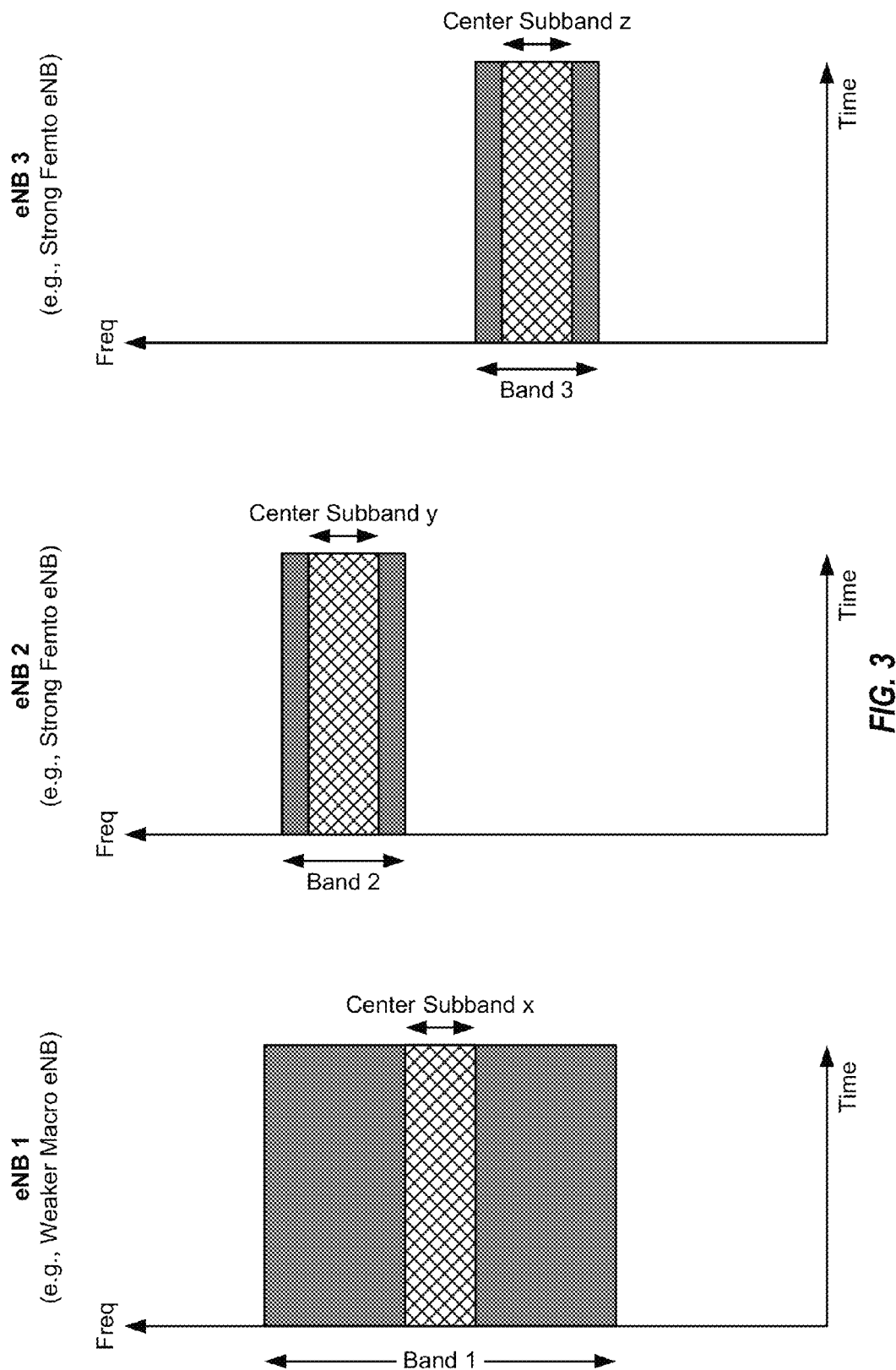
FIGS. 3 to 5 show three exemplary designs of supporting communication on the downlink in a dominant interference scenario.

FIG. 3 shows a design of supporting communication by three eNBs 1, 2 and 3 in a dominant interference scenario. For a restricted association scenario (as shown in FIG. 3), eNB 1 may be a weak macro eNB (e.g., eNB 110c in FIG. 1), and eNBs 2 and 3 may be two strong femto eNBs (e.g., eNBs 110y and 110z in FIG. 1) that may be within range of each other. For a range extension scenario (not shown in FIG. 3), eNB 1 may be a strong macro eNB, and eNBs 2 and 3 may be two weaker eNBs (e.g., pico eNBs, femto eNBs, and/or relays) that may be within range of each other.

eNB 1 may operate in Band 1, which may have any suitable center frequency and bandwidth. eNB 2 may operate in Band 2, which may have a smaller bandwidth than Band 1 and may be completely covered by Band 1. eNB 3 may operate in Band 3, which may also have a smaller bandwidth than Band 1 and may be completely covered by Band 1. Band 3 may be non-overlapping with Band 2, so that strong eNBs 2 and 3 can avoid interfering one another.

eNB 1 may transmit its PSS, SSS and PBCH in the center 1.08 MHz of Band 1, which is denoted as subband x. Bands 2 and 3 may be non-overlapping with subband x, so that strong eNBs 2 and 3 can avoid causing high interference to the PSS, SSS and PBCH of weaker eNB 1. Weaker eNB 1 may transmit its PCFICH, PHICH, PDCCH and PDSCH in a manner to enable reliable reception of these channels by its UEs, even in the presence of high interference on Band 2 and/or Band 3 from strong eNB 2 and/or eNB 3, as described below. eNB 2 may transmit its PSS, SSS and PBCH in the center 1.08 MHz of Band 2, which is denoted as subband y. Band 2 may include only subband y or may include additional bandwidth. eNB 3 may transmit its PSS, SSS and PBCH in the center 1.08 MHz of Band 3, which is denoted as subband z. Band 3 may include only subband z or may include additional bandwidth.

Figure 4:
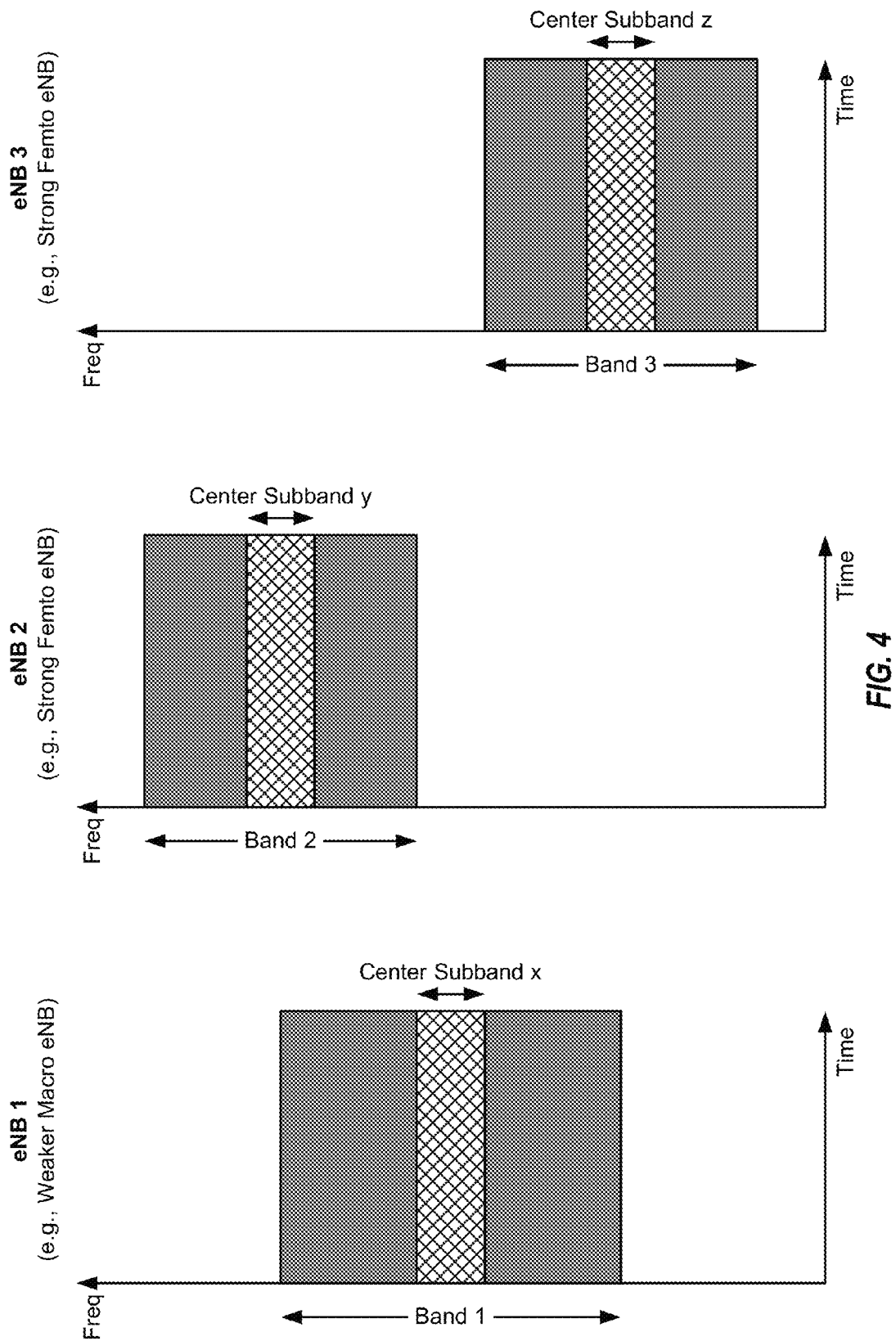

FIG. 4 shows another design of supporting communication by three eNBs 1, 2 and 3 in a dominant interference scenario. eNB 1 may operate in Band 1, which may have any suitable center frequency and bandwidth. eNB 2 may operate in Band 2, which may partially overlap Band 1 and may have the same or different bandwidth as Band 1. eNB 3 may operate in Band 3, which may also partially overlap Band 1 and may have the same or different bandwidth as Band 1. Band 3 may be non-overlapping with Band 2, so that strong eNBs 2 and 3 can avoid interfering to one another.

eNB 1 may transmit its PSS, SSS and PBCH on subband x, which may be the center 1.08 MHz of Band 1. Bands 2 and 3 may be non-overlapping with subband x in order to avoid causing high interference to the PSS, SSS and PBCH of weaker eNB 1. Weaker eNB 1 may transmit its PCFICH, PHICH, PDCCH and PDSCH in a manner to enable reliable reception of these channels by its UEs. eNB 2 may transmit its PSS, SSS and PBCH on subband y, which may be the center 1.08 MHz of Band 2. eNB 3 may transmit its PSS, SSS and PBCH on subband z, which may be the center 1.08 MHz of Band 3.

FIGS. 3 and 4 show two exemplary designs of supporting communication in a dominant interference scenario. The weak and strong eNBs may also be assigned bands in other manners. In general, a strong eNB may overlap only a portion of a band used by a weaker eNB and may further avoid the center subband used by the weaker eNB to send its PSS, SSS and PBCH. Strong eNBs within range of one another may operate on different non-overlapping bands to avoid causing high interference to each other.

Figure 5:
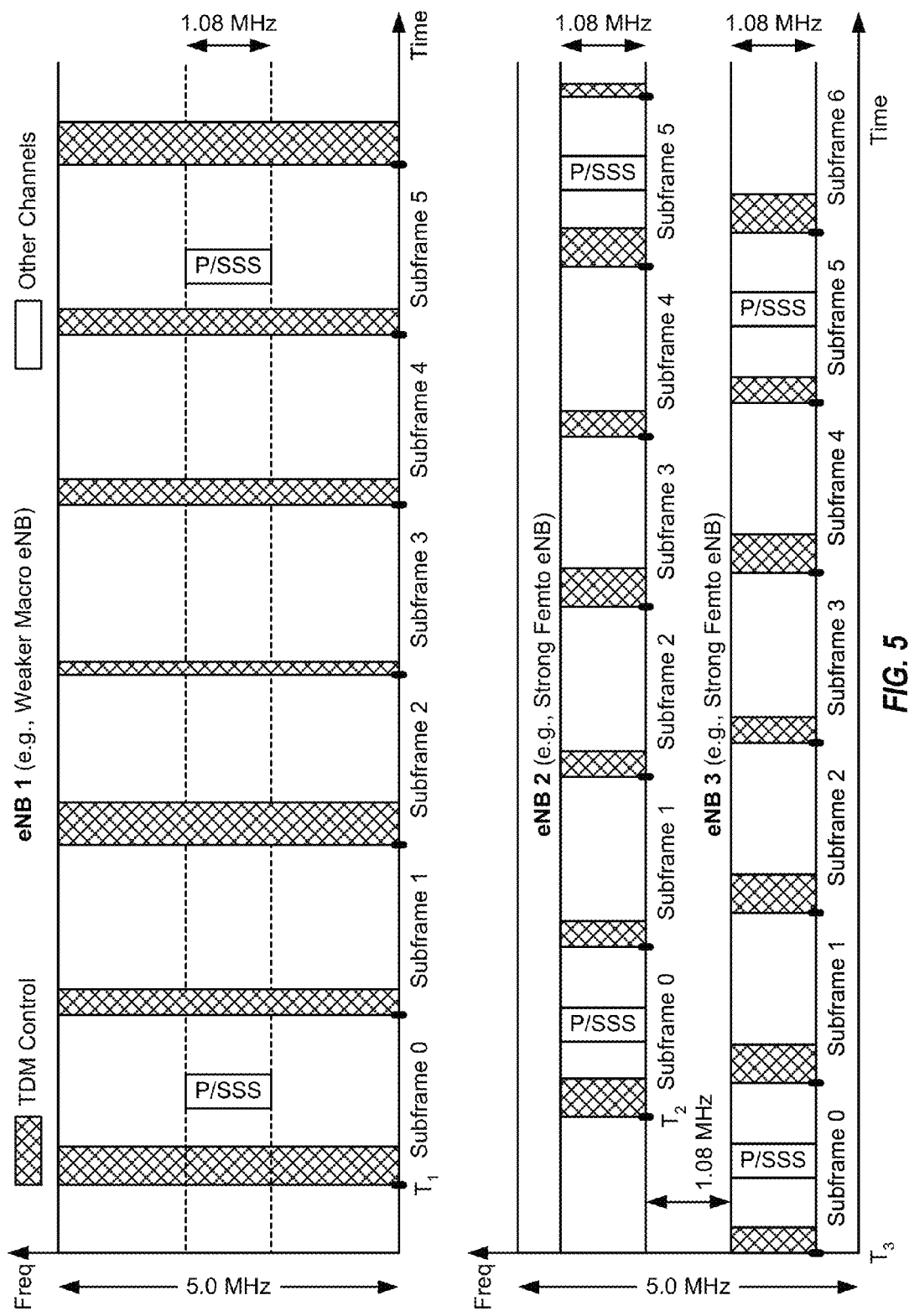

FIG. 5 shows yet another design of supporting communication by three eNBs 1, 2 and 3 in a dominant interference scenario. eNB 1 may operate in Band 1, which may have a bandwidth of 5 MHz. eNB 1 may transmit its PSS, SSS and PBCH on subband x, which may be the center 1.08 MHz of Band 1. eNB 2 may operate in Band 2, which may have a bandwidth of 1.08 MHz and may be adjacent to the high side of subband x. eNB 3 may operate in Band 3, which may have a bandwidth of 1.08 MHz and may be adjacent to the low side of subband x. Band 3 may thus be non-overlapping with Band 2.

In the example shown in FIG. 5, eNBs 1, 2 and 3 may be asynchronous and may have different frame timing. eNB 1 may have its subframe 0 starts at time $T_1$, eNB 2 may have its subframe 0 starts at time $T_2$, and eNB 3 may have its subframe 0 starts at time $T_3$. $T_1$, $T_2$ and $T_3$ may be different start times.

FIG. 5 shows an exemplary design in which weaker eNB 1 operates on a band of 5.0 MHz and strong eNBs 2 and 3 operate on different bands of 1.08 MHz. In this design, the number of smaller bands available for strong eNBs may be dependent on the system bandwidth. For example, up to 8 smaller bands may be available for 10 MHz system bandwidth, and up to 16 smaller bands may be available for 20 MHz system bandwidth. The smaller bands may have a minimum bandwidth of 1.08 MHz corresponding to the smallest bandwidth supported by LTE. In general, the smaller bands may have any suitable fixed or configurable bandwidths.

As shown in FIG. 5, weaker eNB 1 may transmit its PSS, SSS and PBCH in the center 1.08 MHz in designated symbol periods. The PSS, SSS and PBCH from weaker eNB 1 may avoid interference from strong eNBs 2 and 3 and may be detectable even by disadvantaged UEs, which may be located within the coverage of eNBs 2 and 3 but may be unable to access eNBs 2 and 3. Weaker eNB 1 may also transmit its PCFICH and PHICH across the entire Band 1 in the first M symbol periods of each subframe, where M may vary from subframe to subframe. The PCFICH and PHICH from weaker eNB 1 may observe interference from strong eNB 2 and/or 3 but may be sent as described below to enable reception by the disadvantaged UEs.

Strong eNB 2 may transmit its PSS, SSS, PBCH, PCFICH, PHICH and PDCCH across the entire Band 2 in designated symbol periods. The transmissions from strong eNB 2 may observe some interference from weaker eNB 1 and may avoid interference from strong eNB 3. These transmissions may be reliably received by UEs within the coverage of eNB 2. Similarly, strong eNB 3 may transmit its PSS, SSS, PBCH, PCFICH and PHICH across the entire Band 3 in designated symbol periods. The transmissions from strong eNB 3 may observe some interference from weaker eNB 1 and may avoid interference from strong eNB 2. These transmissions may be reliably received by UEs within the coverage of eNB 3.

UEs within the coverage of strong eNBs 2 and 3 and allowed to access these eNBs may operate in the normal manner. For example, a UE may desire to communicate with strong eNB 2, which may be a home eNB for the UE. The UE may be within the coverage of strong eNB 3, which may be another femto eNB that the UE cannot access. eNB 3 may act as a dominant interferer to the UE. eNBs 2 and 3 may operate on different bands to allow the UE to communicate with eNB 2. If eNBs 2 and 3 operate on the same band, then the UE may be unable to communicate with eNB 2 due to high interference from eNB 3.

Weaker eNB 1 may transmit its PCFICH, PHICH, PDCCH and PDSCH in a manner to enable reliable reception by disadvantaged UEs located within the coverage of strong eNB 2 and/or 3 but connected to eNB 1. Weaker eNB 1 may transmit the PCFICH in the first symbol period of each subframe by repeating it every 1.08 MHz across frequency. In the exemplary design shown in FIG. 5, weaker eNB 1 may send four transmissions of the PCFICH across 5 MHz Band 1. If high interference is observed on only one 1.08 MHz band from one strong eNB (e.g., eNB 2 or 3), then a disadvantaged UE may be able to receive three "looks" of the PCFICH without high interference from this strong eNB. Each look may correspond to one transmission of the PCFICH sent in one 1.08 MHz portion of the bandwidth used for transmission. The disadvantaged UE may be able to reliably decode the PCFICH as described below. In another design, weaker eNB 1 may set the PCFICH to a fixed default value (e.g., M=3) if it determines that the PCFICH may not be reliably received by some disadvantaged UEs. Weaker eNB 1 may then transmit the PHICH and PDCCH in accordance with the default value for the PCFICH.

Weaker eNB 1 may transmit the PHICH in the first M symbol periods of each subframe by repeating it three times across frequency. In the exemplary design shown in FIG. 5, if high interference is observed on only one 1.08 MHz band from one strong eNB, then a disadvantaged UE may be able to receive at least two looks of the PHICH without high interference from this strong eNB. The disadvantaged UE may be able to reliably decode the PHICH as described below.

Weaker eNB 1 may transmit the PDCCH in specific resource element groups (REGs) in the first M symbol periods of each subframe. In one design, weaker eNB 1 may select REGs with less interference from other eNBs, e.g., REGs outside the band used by each strong eNB. It another design, eNB 1 may select REGs in a UE search space to include the minimum number of REGs with high interference. In any case, weaker eNB 1 may transmit the PDCCH on the selected REGs to the disadvantaged UEs. Each UE may process different possible REGs to detect for transmissions sent on the PDCCH to that UE.

Weaker eNB 1 may transmit the PDSCH to specific UEs served by the eNB. Weaker eNB 1 may schedule the disadvantaged UEs on resource blocks expected to observe low interference, e.g., on resource blocks outside the band used by each strong eNB. The disadvantaged UEs may thus be scheduled by keeping in mind possible loss of performance due to high interference in each band used by a strong eNB. Weaker eNB 1 may also use lower modulation and coding schemes for the disadvantaged UEs.

Weaker eNB 1 may transmit the PDCCH and PDSCH on resources selected to avoid high interference. Weaker eNB 1 may also transmit the PCFICH, PHICH, PDCCH and/or PDSCH in a manner to improve reception by the disadvantaged UEs. In one design, weaker eNB 1 may increase the transmit power of a given channel (e.g., the PHICH, PDCCH, etc.) sent to the disadvantaged UEs. Weaker eNB 1 may uniformly increase the transmit power of all modulation symbols transmitted on the channel. Alternatively, weaker eNB 1 may reduce or blank the transmit power of modulation symbols expected to observe high interference and may boost the transmit power of modulation symbols expected to observe low interference. This may be beneficial to UEs that are aware of the high interference. Weaker eNB 1 may also increase the transmit power of symbols expected to observe high interference, which may be beneficial to UEs that are not aware of the high interference. Weaker eNB 1 may also distribute the available transmit power across the symbols transmitted on the channel in other manners. Weaker eNB 1 may increase the transmit power of the channel without informing UEs. Alternatively, weaker eNB 1 may inform the UEs of the transmit power boost applied to the channel. In another design, weaker eNB 1 may use a lower code rate and/or a lower modulation order for a channel in which a fair number of modulation symbols may observe high interference. Weaker eNB 1 may select the code rate and/or the modulation order based on an estimate of the percentage of modulation symbols that may observe high interference. In yet another design, weaker eNB 1 may use more REGs for the channel sent to the disadvantaged UEs. For example, weaker eNB 1 may send the channel on 18 REGs instead of 9 REGs in order to improve reception of the channel. A combination of the above designs may also be used to ensure reliable reception of a channel by the disadvantaged UEs.

Table 1 summarizes transmission of the PSS, SSS, PBCH, PCFICH, PHICH, PDCCH and PDSCH by weaker eNB 1 in a manner to ensure reliable reception of these signals and channels.

TABLE 1

| Channel/Signal | Description |
| --- | --- |
| PSS, SSS, & PBCH | Sent in a center subband that is non-overlapping with bands of strong eNBs. |
| PCFICH | Sent across an entire band and can withstand puncturing of some symbols by high interference from strong eNBs. Transmit power may also be boosted. Designed for reliable reception even at cell edge. |
| PHICH | Sent across an entire band and can withstand puncturing of some symbols by high interference from strong eNBs. Power control may be applied (e.g., by taking away power from REGs with high interference). |

TABLE 1-continued

| Channel/Signal | Description |
| --- | --- |
| PDCCH | Sent on frequency resources that are non-overlapping or partially overlapping with bands of strong eNBs. Power control, rate control, and scheduling may be performed to reduce impact of interference. |
| PDSCH | Sent on resources to reduce interference from strong eNB if possible. Power control and/or rate control may be used. |

Each eNB may transmit a cell-specific reference signal for each cell in that eNB. The cell-specific reference signal may be generated based on a known sequence and may be sent on specific subcarriers in specific symbol periods of each subframe. The cell-specific reference signal may be used for channel estimation, signal quality estimation, interference estimation, and other purposes. For example, a UE may derive a channel estimate based on the cell-specific reference signal and may use the channel estimate to decode the PHICH, PDCCH, PDSCH, etc.

A disadvantaged UE may communicate with weaker eNB 1 on Band 1 and may observe interference from eNBs 2 and 3 on Bands 2 and 3. The UE may be informed of the bands of neighbor eNBs, e.g., by weaker eNB 1, the network, etc.

The disadvantaged UE may obtain received symbols from all subcarriers in Band 1 for weaker eNB 1 in each symbol period. Some received symbols may have high interference from one or more strong eNBs while other received symbols may have low interference from other eNBs. The UE may estimate the interference by taking into account variations in the interference across Band 1 due to partial overlap with bands of other eNBs. For example, the UE may average the interference estimates across frequency to improve the quality of the interference estimate. The UE may also perform averaging separately for different parts of Band 1 with different interference levels, e.g., average a first part with higher interference separately from a second part with less interference.

The control and data regions may observe different amounts of interference. For example, a femto eNB may occupy part of a band, a macro eNB may occupy the entire band, and the timing of the femto and macro eNBs may be aligned. The femto eNB may be lightly loaded (e.g., may not have any data to transmit and/or may transmit data only on part of the band) but may transmit control information. The UE may be unable to access the femto eNB, may try to connect to the macro eNB, and may observe different interference levels in the data region and control region in the band occupied by the femto eNB. The UE may estimate the interference for each region based on the reference signal received in that region.

The disadvantaged UE may decode the PCFICH and PHICH sent across the entire band by weaker eNB 1 by taking into account interference observed by the UE. In a first design, the disadvantaged UE may discard received symbols with high interference and may decode the PCFICH and PHICH based on undiscarded received symbols with low interference. For example, the UE may estimate the amount of interference for each set of one or more received symbols, discard each set of received symbols with interference exceeding a high threshold, and use each set of received symbols with interference below the high threshold. The high interference from strong eNBs may then puncture or delete some received symbols at the disadvantaged UE. In a second design, the disadvantaged UE may use all received symbols for decoding but may give received symbols with high interference less weight in the decoding process. In a third design, the disadvantaged UE may estimate and cancel interference on received symbols with high interference. The UE may then use these received symbols, after interference cancellation, for decoding. The disadvantaged UE may also perform decoding by taking into account high interference observed by some received symbols in other manners.

For the exemplary design shown in FIG. 5, the disadvantaged UE may be able to reliably decode the PCFICH from weaker eNB 1 based on three looks with low interference, when high interference is observed on only one 1.08 MHz band from one strong eNB. The disadvantaged UE may be able to reliably decode the PHICH from weaker eNB 1 based on at least two looks with low interference, when high interference is observed on only one 1.08 MHz band. The disadvantaged UE may decode the PDCCH and PDSCH from weaker eNB 1 using any of the designs described above for decoding the PCFICH and PHICH. The disadvantaged UE may discard received symbols with high interference, give these received symbols less weight in the decoding process, estimate and cancel interference from these received symbols, etc. The disadvantaged UE may also gain from higher transmit power and/or lower modulation and coding schemes used by weaker eNB 1 for the PDCCH and PDSCH sent to the UE.

The disadvantaged UE may also receive a cell-specific reference signal from weaker eNB 1. The disadvantaged UE may retain a portion of the reference signal received on a portion of Band 1 without high interference and may discard the remaining portion of the reference signal received on another portion of Band 1 with high interference. The disadvantaged UE may also perform channel estimation by taking into account the higher interference on some received reference symbols.

The disadvantaged UE may determine one or more bands with high interference from one or more strong eNBs in various manners. The disadvantaged UE may detect for eNBs, e.g., based on the primary and secondary synchronization signals transmitted by these eNBs. In one design, the UE may determine the band used by each detected eNB as well as the amount of interference received from the eNB based on the cell-specific reference signal transmitted by the eNB. In another design, the UE may determine the band used by each detected eNB based on system information or some other transmission from the eNB. In yet another design, the UE may determine the band used by each detected eNB based on a neighbor list sent by the serving eNB. The UE may also determine the band used by each detected eNB in other manners. The UE may estimate the interference from each detected eNB based on the cell-specific reference signal, the synchronization signals, and/or other transmissions received from the eNB. The UE may use the information on the band and the interference from each detected eNB to decode various channels, as described above.

In one design, the disadvantaged UE may determine whether the PCFICH can be reliably received from weaker eNB 1, e.g., based on the estimated interference from other eNBs. For example, the disadvantaged UE may determine that the PCFICH can be reliably received if at least a certain percentage of Band 1 used by weaker eNB 1 has interference below a threshold. The disadvantaged UE may decode the PCFICH if it can be reliably decoded and may use a default value for M (e.g., M=3) if the PCFICH cannot be reliably decoded. The UE may process the PHICH and PDCCH from weaker eNB 1 based on the decoded or default value of M.

In one design, weaker eNB 1 may transmit one or more control channels (e.g., the PCFICH, PHICH and/or PDCCH) in a data segment instead of a control segment. For each subframe, the control segment may cover all subcarriers in the first M symbol periods, and the data segment may cover all subcarriers in the remaining symbol periods of the subframe. Weaker eNB 1 may transmit the "displaced" control channel(s) in the portion of Band 1 with low interference during the data portion. Weaker eNB 1 may inform its UEs of the time and frequency resources used for the displaced control channel(s), e.g., via upper layer signaling. This design may ensure that the control channel(s) can avoid high interference from strong eNBs.

For a range extension scenario, eNB 1 may be a strong macro eNB, and eNBs 2 and 3 may be two weaker eNBs (e.g., pico eNBs and/or relays) that may be within range of each other. Strong eNB 1 may cause high interference to UEs communicating with weaker eNB 2 or 3. Strong eNB 1 may then reduce interference on the band used by each weaker eNB to allow the weaker eNB to communicate with its UEs. For example, strong eNB 1 may reduce its transmit power on the band used by each weaker eNB to a sufficiently low power level (possibly zero). Strong eNB 1 may send its PCFICH, PHICH, PDCCH and PDSCH in the remaining part of its band using any of the designs described above to ensure reliable reception of these channels by its UEs.

A femto eNB may occupy part of the system bandwidth (which may be referred to as the femto bandwidth), and a macro eNB may occupy the entire system bandwidth. In one design, the femto eNB may schedule a UE only in the femto bandwidth. In another design, the femto eNB may schedule the UE outside of the femto bandwidth but within the system bandwidth. To allow control channels from the macro eNB to go through, the femto eNB may avoid transmitting signals in a control region for the macro eNB. The femto eNB may not know the number of TDM control symbols being sent by the macro eNB and may assume the maximum number of TDM control symbols. The macro eNB may need to use these resources to serve UEs barred from accessing the femto eNB. The macro eNB may then ask (e.g., via the backhaul and/or over the air through UEs) the femto eNB to stop using these resources.

In LTE, a UE may send a Physical Uplink Control Channel (PUCCH) in each subframe in which the UE has only control information to send and resources are allocated to the UE. The UE may send a Physical Uplink Shared Channel (PUSCH) in each subframe in which the UE has only data or both data and control information to send and resources are allocated to the UE. The UE may send the PUCCH or PUSCH (i) on a first set of contiguous subcarriers in a first half of a band used for the uplink in a first slot of a subframe and (ii) on a second set of contiguous subcarriers in a second half of the band in a second slot of the subframe. Sending the PUCCH or PUSCH in both halves of the band may provide frequency diversity.

Figure 6:
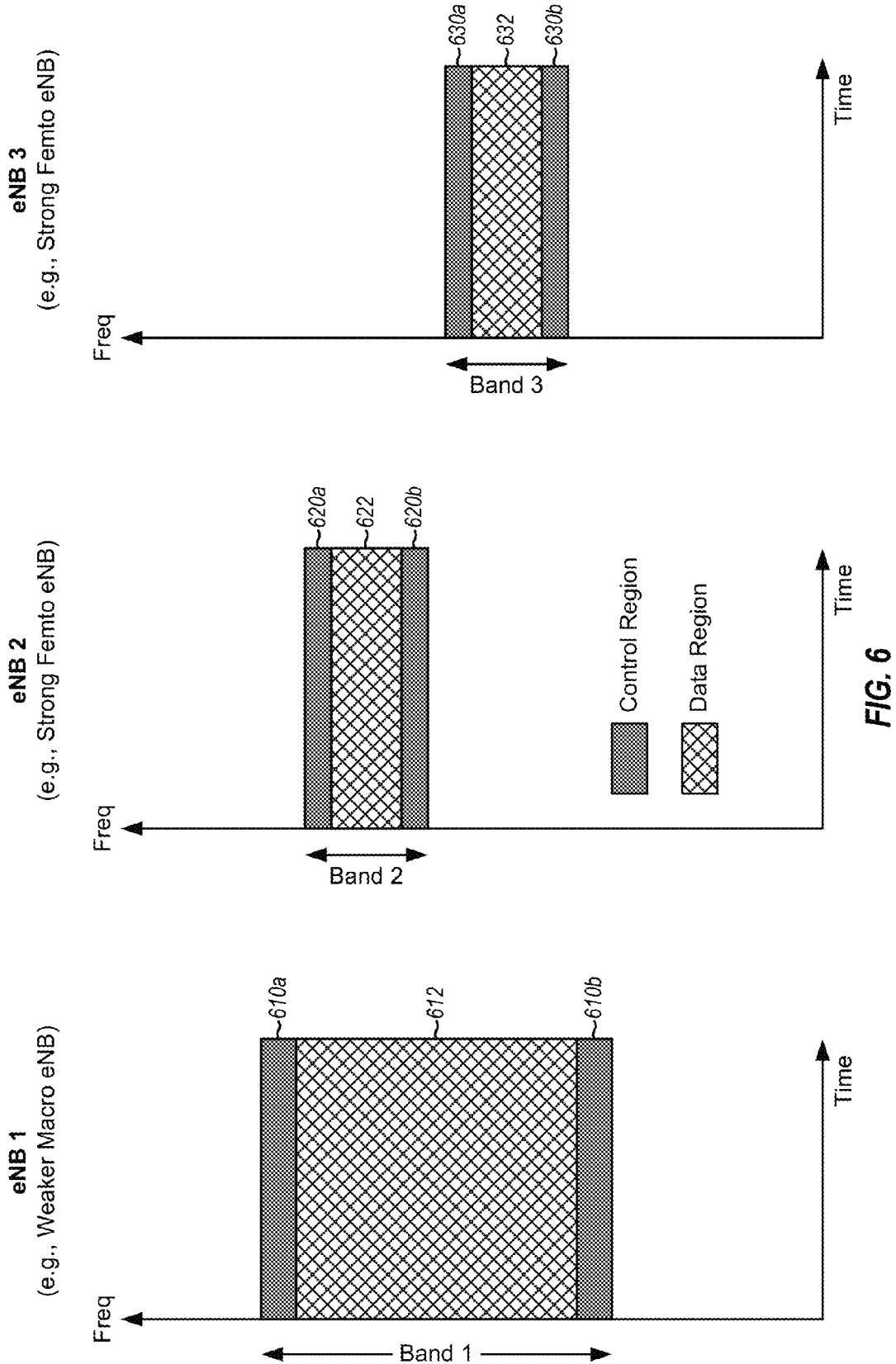
FIGS. 6 to 9 show four exemplary designs of supporting communication on the uplink in a dominant interference scenario.

FIG. 6 shows a design of supporting uplink communication for three eNBs 1, 2 and 3 in a dominant interference scenario. Band 1 may be used for the uplink for eNB 1 and may have any suitable center frequency and bandwidth. Band 2 may be used for the uplink for eNB 2, may have a smaller bandwidth than Band 1, and may be completely covered by Band 1. Band 3 may be used for the uplink for eNB 3, may have a smaller bandwidth than Band 1, and may be completely covered by Band 1. Band 3 may be non-overlapping with Band 2, so that uplink transmissions to eNBs 2 and 3 can avoid interfering one another.

UEs communicating with eNB 1 may transmit the PUCCH in a control region 610a and 610b located near the two edges of Band 1 and may transmit the PUSCH in a data region 612 located in the middle of Band 1. UEs communicating with eNB 2 may transmit the PUCCH in a control region 620a and 620b located near the two edges of Band 2 and may transmit the PUSCH in a data region 622 located in the middle of Band 2. UEs communicating with eNB 3 may transmit the PUCCH in a control region 630a and 630b located near the two edges of Band 3 and may transmit the PUSCH in a data region 632 located in the middle of Band 3. Control regions 610a and 610b, 620a and 620b, and 630a and 630b may be non-overlapping to avoid interference on the PUCCH for the three eNBs.

Figure 7:
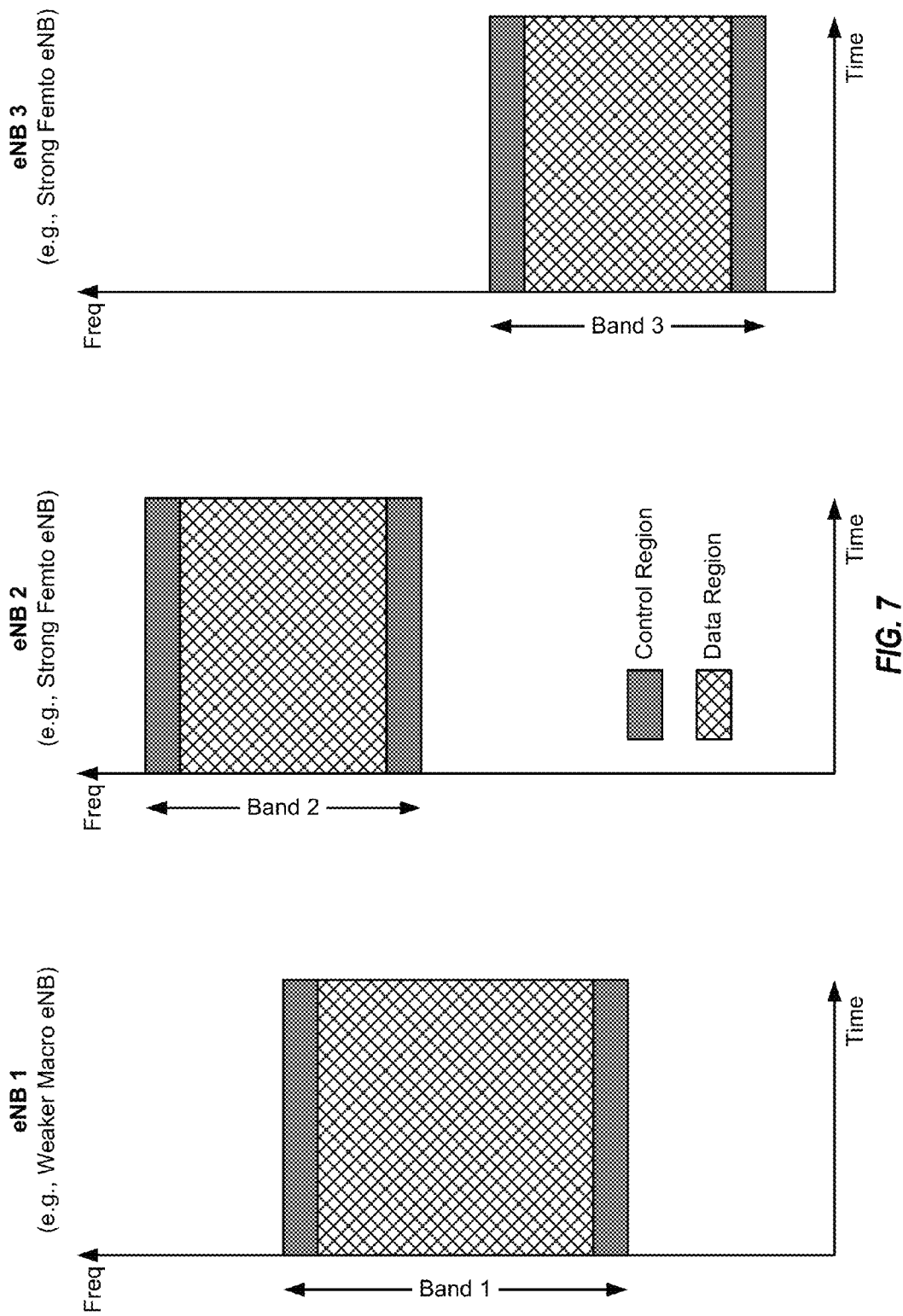

FIG. 7 shows another design of supporting uplink communication for three eNBs 1, 2 and 3 in a dominant interference scenario. Band 1 may be used for the uplink for eNB 1 and may have any suitable center frequency and bandwidth. Band 2 may be used for the uplink for eNB 2, may partially overlap Band 1, and may have the same or different bandwidth as Band 1. Band 3 may be used for the uplink for eNB 3, may partially overlap Band 1, and may have the same or different bandwidth as Band 1. Band 3 may be non-overlapping with Band 2, so that uplink transmissions to eNBs 2 and 3 can avoid interfering to one another.

Figure 8:
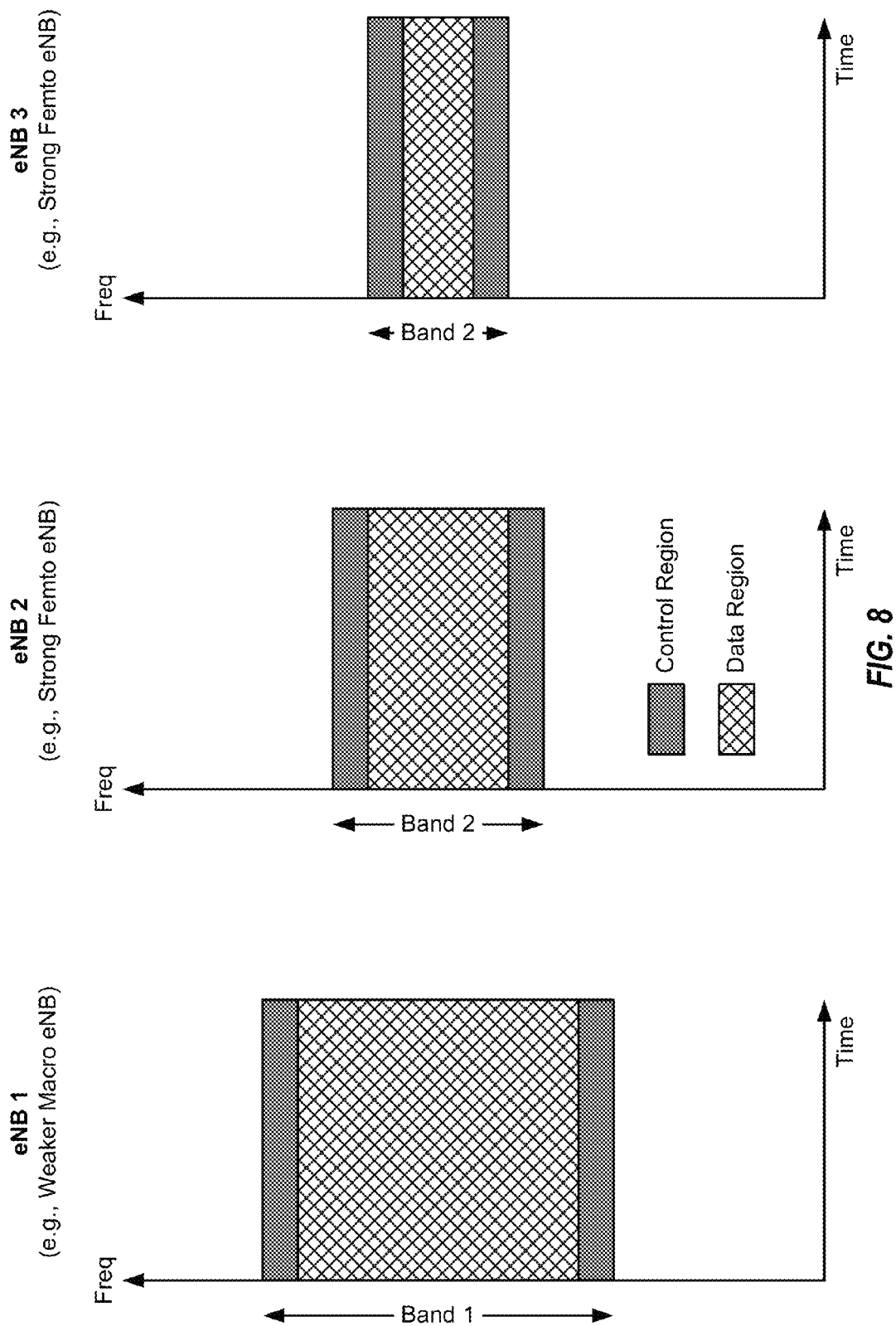

FIG. 8 shows yet another design of supporting uplink communication for three eNBs 1, 2 and 3 in a dominant interference scenario. Band 1 may be used for the uplink for eNB 1 and may have any suitable center frequency and bandwidth. Band 2 may be used for the uplink for eNB 1, may have a smaller bandwidth than Band 1, and may be completely covered by Band 1. Band 3 may be used for the uplink for eNB 3, may have a smaller bandwidth than Band 2, and may be completely covered by Band 2.

Figure 9:
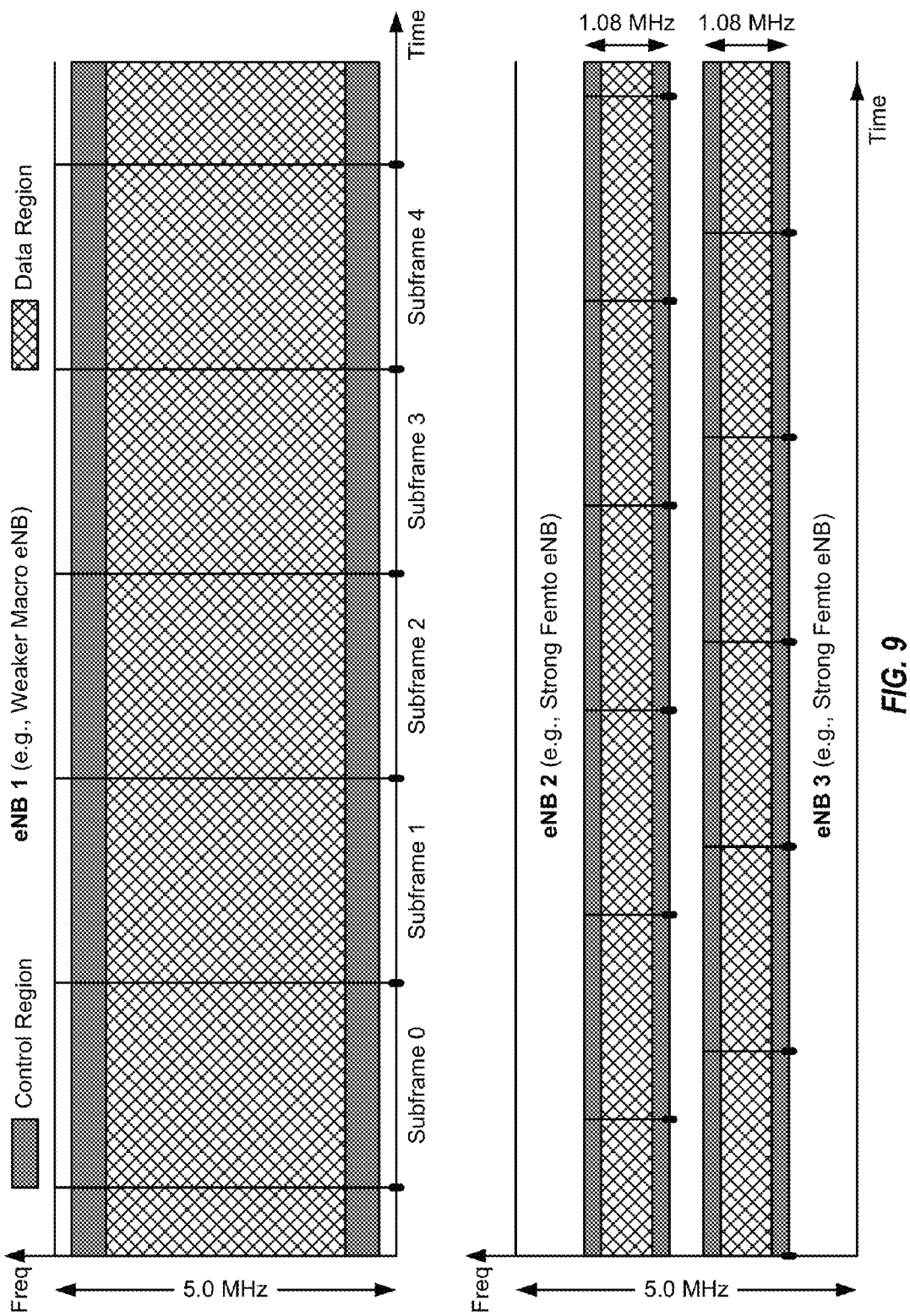

FIG. 9 shows yet another design of supporting uplink communication for three eNBs 1, 2 and 3 in a dominant interference scenario. Band 1 may be used for the uplink for eNB 1 and may have a bandwidth of 5 MHz. Band 2 may be used for the uplink for eNB 2 and may have a bandwidth smaller than 2.5 MHz. Band 3 may be used for the uplink for eNB 3 and may also have a bandwidth smaller than 2.5 MHz. For example, Bands 2 and 3 may each have a bandwidth of 1.08 MHz, as shown in FIG. 9.

For the designs shown in FIGS. 6 to 9, each eNB may allocate frequency resources in the control region near the two edges of its band for the PUCCH and may allocate frequency resources in the data region in the middle of the band for the PUSCH. The bands for the three eNBs may be defined such that the control regions for these eNBs are non-overlapping. This may then avoid interference on the PUCCH for each eNB.

UEs communicating with weaker eNB 1 may be dominant interferers to strong eNBs 2 and 3. By selecting the bands for the three eNBs (e.g., as shown in FIG. 6, 7, 8 or 9), the PUCCH transmissions from the UEs communicating with weaker eNB 1 would not interfere with the PUCCH transmissions from UEs communicating with eNBs 2 and 3. The UEs communicating with weaker eNB 1 may also be scheduled such that (i) UEs causing high interference to eNB 2 may send their PUSCH transmissions on frequency resources non-overlapping with Band 2, and (ii) UEs causing high interference to eNB 3 may send their PUSCH transmissions on frequency resources non-overlapping with Band 3.

FIGS. 6 to 9 show some exemplary designs of supporting communication on the uplink in a dominant interference scenario. Strong and weaker eNBs may also be assigned bands for the uplink in other manners. The eNBs may be assigned bands such that the PUCCH for these eNBs are non-overlapping. UEs that may cause high interference to a given eNB may be scheduled such that their PDSCH can avoid the band used by that eNB.

On the uplink, a first UE may communicate with a weaker first eNB (e.g., a macro eNB or a femto eNB) and may cause high interference to a second eNB (e.g., another femto eNB). To enable the second eNB to communicate with its UEs, the first UE (i) should not cause excessive interference to the PUCCH of the UEs served by the second eNB and (ii) should not use at least part of the band assigned to the second eNB to allow the UEs to send data to the second eNB. Parts (i) and (ii) may be achieved by controlling the bandwidth of the first and second eNBs to ensure orthogonal PUCCH resources for the two eNBs and to ensure that the first UE does not transmit data in the bandwidth of the second eNB. The first eNB may identify the resources used for the PUCCH and PUSCH by the eNB2 (e.g., via the backhaul and/or the first UE) and may avoid using those resources.

Parts (i) and (ii) may also be achieved with control orthogonalization. The first eNB may desire to serve the first UE, which may cause high interference to the second eNB. The first eNB may be assigned a set of uplink resources that may be used only for its UEs. Other UEs in the coverage area of the first eNB may not be allowed to use these assigned resources for their PUCCH and PUSCH. The assigned resources for the first eNB may be non-overlapping with the assigned resources for neighbor eNBs. The first eNB can learn about the neighbor eNBs via reports from UEs served by the first eNB, by detecting for other eNBs, via communication through the backhaul, etc. The first eNB may advertise the assigned uplink resources. The second UE may be within the coverage of the first eNB, may communicate with the second eNB, and may inform the second eNB to not schedule the second UE in the assigned uplink resources of the first eNB. Alternately, the assigned resources of different eNBs may be non-overlapping (orthogonal), so if the first UE is scheduled on the assigned resource of the eNB there is no problem.

In one design, a downlink band and an uplink band for each eNB may have the same bandwidth, and the center frequency of the downlink band may be separated from the center frequency of the uplink band by a fixed offset. In another design, the downlink band and the uplink band may have different bandwidths and/or may not be separately by a fixed offset.

For simplicity, FIGS. 3 to 9 show partitioning of the system bandwidth to support communication by three eNBs in a dominant interference scenario. In general, the system bandwidth may be partitioned into any number of frequency bands, which may be non-overlapping or partially overlapping. Different eNBs may be assigned different frequency bands. Frequency bands used by femto eNBs may be selected such that they occupy only part of the frequency bands used by macro eNBs, so that the femto eNBs (i) do not cause too many symbols of the PCFICH, PHICH, PDCCH and/or other channels from the macro eNBs to be lost and (ii) can avoid the frequency range carrying the PSS, SSS, and PBCH from the macro eNBs. Frequency bands of femto eNBs that may be dominant interferers to each other may be selected such that they are non-overlapping whenever possible.

A UE may detect a dominant interfering eNB and may report the presence of the interfering eNB, e.g., via a CQI report sent to a serving eNB. The UE may also report CQI information for frequency subband(s) with less interference. The CQI information from the UE may be used by the serving eNB to select appropriate frequency resources to send various channels to enable reliable reception by UEs.

Figures 10, 11:
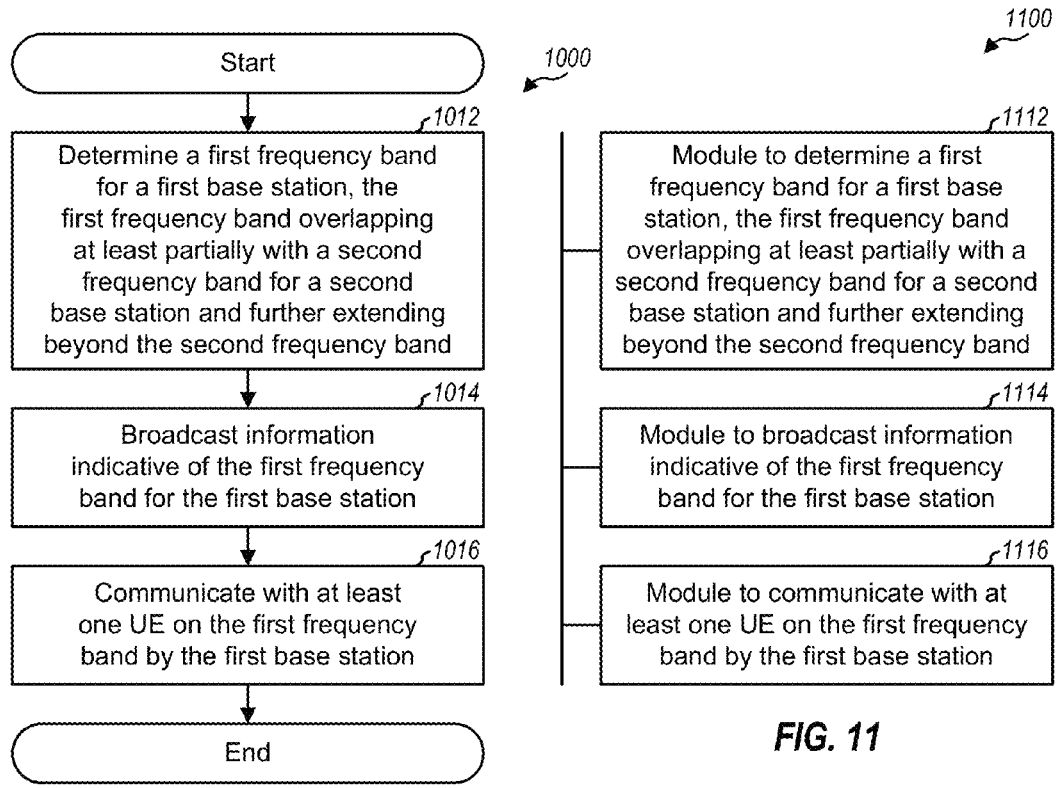
FIG. 10 shows a process performed by a base station.
FIG. 11 shows an apparatus for a base station.

FIG. 10 shows a design of a process 1000 performed by a first base station/eNB for communication with UEs. The first base station (e.g., macro eNB 1 in FIGS. 3 to 5) may determine a first frequency band (e.g., Band 1) for use by the first base station (block 1012). The first frequency band may overlap at least partially with a second frequency band (e.g., Band 2 in FIGS. 3 to 5) for a second base station (e.g., femto eNB 2) and may further extend beyond the second frequency band. The first frequency band may have a larger bandwidth than the second frequency band and may completely cover the second frequency band (e.g., as shown in FIGS. 3 and 5). The second frequency band may also extend beyond the first frequency band (e.g., as shown in FIG. 4). The first frequency band may also overlap at least partially with a third frequency band (e.g., Band 3 in FIGS. 3 to 5) for a third base station (e.g., eNB 3). The third frequency band may be non-overlapping with the second frequency band. The first base station may broadcast information indicative of the first frequency band for the first base station. The first base station may also broadcast information indicative of the second frequency band for the second base station and/or the third frequency band for the third base station. The first base station may communicate with at least one UE on the first frequency band (block 1016).

In one design of block 1016, the first base station may use the first frequency band for communication on the downlink. The first base station may send at least one synchronization signal (e.g., the PSS and SSS) in a center portion of the first frequency band for use by UEs to detect the first base station. The first base station may also send a broadcast channel (e.g., the PBCH) in the center portion of the first frequency band. The second and third frequency bands may be non-overlapping with the center portion of the first frequency band (e.g., as shown in FIGS. 3 to 5). The first base station may send multiple transmissions of a control channel (e.g., the PCFICH or PHICH) across the first frequency band to allow UEs to receive at least one transmission of the control channel without interference from the second base station. The first base station may send the control channel with higher transmit power in a portion of the first frequency band that is non-overlapping with the second frequency band. The first base station may also send the control channel with a lower modulation and coding scheme to account for high interference from the second and/or third base station in a portion of the first frequency band. The first base station may also send a control channel (e.g., the PDCCH) and/or a data channel (e.g., the PDSCH) to at least one UE in a portion of the first frequency band, which may be non-overlapping with the second frequency band or may minimally overlap the second frequency band.

In another design of block 1016, the first base station may use the first frequency band for communication on the uplink. The first base station may receive a control channel (e.g., the PUCCH) sent by at least one UE in a control region of the first frequency band. The control region may be non-overlapping with the second frequency band. The first base station may also receive a data channel (e.g., the PUSCH) sent by the at least one UE in a data region of the first frequency band. The data region may be assignable for data transmission on the uplink and may be non-overlapping with the second frequency band. The control region may be non-overlapping with the data region, e.g., as shown in FIGS. 6 to 9. The control region of the first frequency band may be non-overlapping with a control region of the second frequency band, e.g., as shown in FIGS. 6 to 9.

In one design, for a restricted association scenario, the first base station may be a macro base station. The second and third base stations may be femto base stations with restricted access and causing high interference on the downlink to UE communicating with the first base station. In another design, the first base station may be a pico base station, and the second base station may be a macro base station. The first and second base stations may also be other types of base stations in other scenarios.

FIG. 11 shows a design of an apparatus 1100 for a base station/eNB. Apparatus 1100 includes a module 1112 to determine a first frequency band for a first base station, with the first frequency band overlapping at least partially with a second frequency band for a second base station and further extending beyond the second frequency band, a module 1114 to broadcast information indicative of the first frequency band for the first base station, and a module 1116 to communicate with at least one UE on the first frequency band by the first base station.

Figure 12:
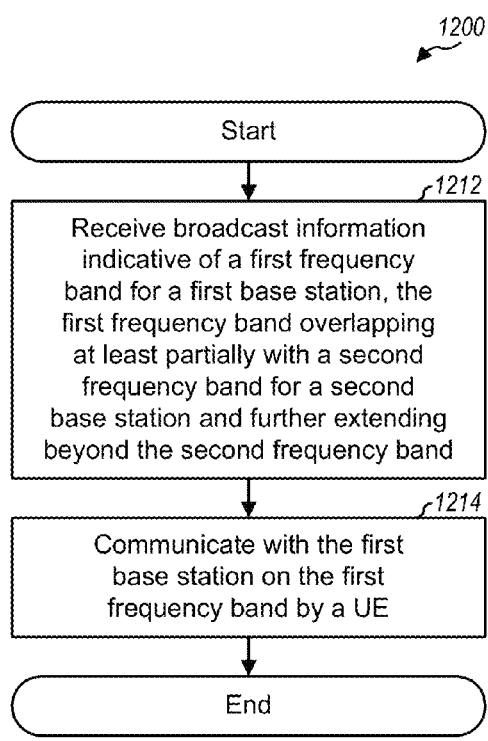
FIG. 12 shows a process performed by a UE.

FIG. 12 shows a design of a process 1200 performed by a UE for communication. The UE may receive broadcast information indicative of a first frequency band (e.g., Band 1) for a first base station (e.g., macro eNB 1 in FIGS. 3 to 5). The first frequency band may overlap at least partially with a second frequency band (e.g., Band 2) for a second base station (e.g., femto eNB 2) and may further extend beyond the second frequency band. The first frequency band may have a larger bandwidth than the second frequency band and may completely cover the second frequency band (e.g., as shown in FIGS. 3 and 5). The second frequency band may also extend beyond the first frequency band (e.g., as shown in FIG. 4). The UE may communicate with the first base station on the first frequency band (block 1214).

In one design of block 1214, for communication on the downlink, the UE may receive at least one synchronization signal (e.g., the PSS and SSS) sent by the first base station in a center portion of the first frequency band. The center portion may be non-overlapping with the second frequency band. The UE may receive a control channel (e.g., the PCFICH or PHICH) sent by the first base station across the first frequency band. The UE may also receive a control channel (e.g., the PDCCH) and/or a data channel (e.g., the PDSCH) sent by the first base station to the UE in a portion of the first frequency band. This portion may be non-overlapping with the second frequency band. For a given channel, the UE may obtain received symbols for the channel, estimate interference observed by the received symbols, and decode the received symbols by taking into account the estimated interference to recover the information sent in the channel. In one design, the UE may discard received symbols with high interference and may decode the undiscarded received symbols to recover the information sent in the channel. In another design, the UE may weigh the received symbols based on the estimated interference and may decode the weighted received symbols to recover the information sent in the channel. The UE may estimate the interference based on the received power of a reference signal and/or other transmissions from the second base station. The UE may obtain multiple interference estimates for different parts of the first frequency band.

In one design, the UE may determine whether a given control channel (e.g., the PCFICH) from the first base station can be reliably decoded. The UE may decode the control channel if it can be reliably decoded and may use a default value for the control channel if it cannot be reliably decoded.

In another design of block 1214, for communication on the uplink, the UE may send a control channel (e.g., the PUCCH) to the first base station in a control region of the first frequency band. The control region may be non-overlapping with the second frequency band. The UE may also send a data channel (e.g., the PUSCH) to the first base station in a data region of the first frequency band. The data region may be assignable for data transmission on the uplink and may be non-overlapping with the second frequency band. The control region may be non-overlapping with the data region.

For a restricted association scenario, the first base station may be a macro base station, and the second base station may be a femto base station with restricted access and observing high interference from the UE on uplink. In other scenarios, the first base station may be a macro base station, and the second base station may be a pico base station, a relay, etc.

Figure 13:
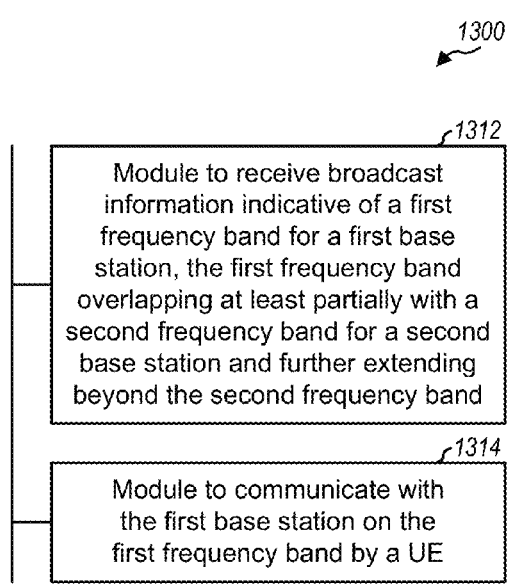
FIG. 13 shows an apparatus for a UE.

FIG. 13 shows a design of an apparatus 1300 for a UE. Apparatus 1300 includes a module 1312 to receive broadcast information indicative of a first frequency band for a first base station, with the first frequency band overlapping at least partially with a second frequency band for a second base station and further extending beyond the second frequency band, and a module 1314 to communicate with the first base station on the first frequency band by the UE.

Figures 14, 15:
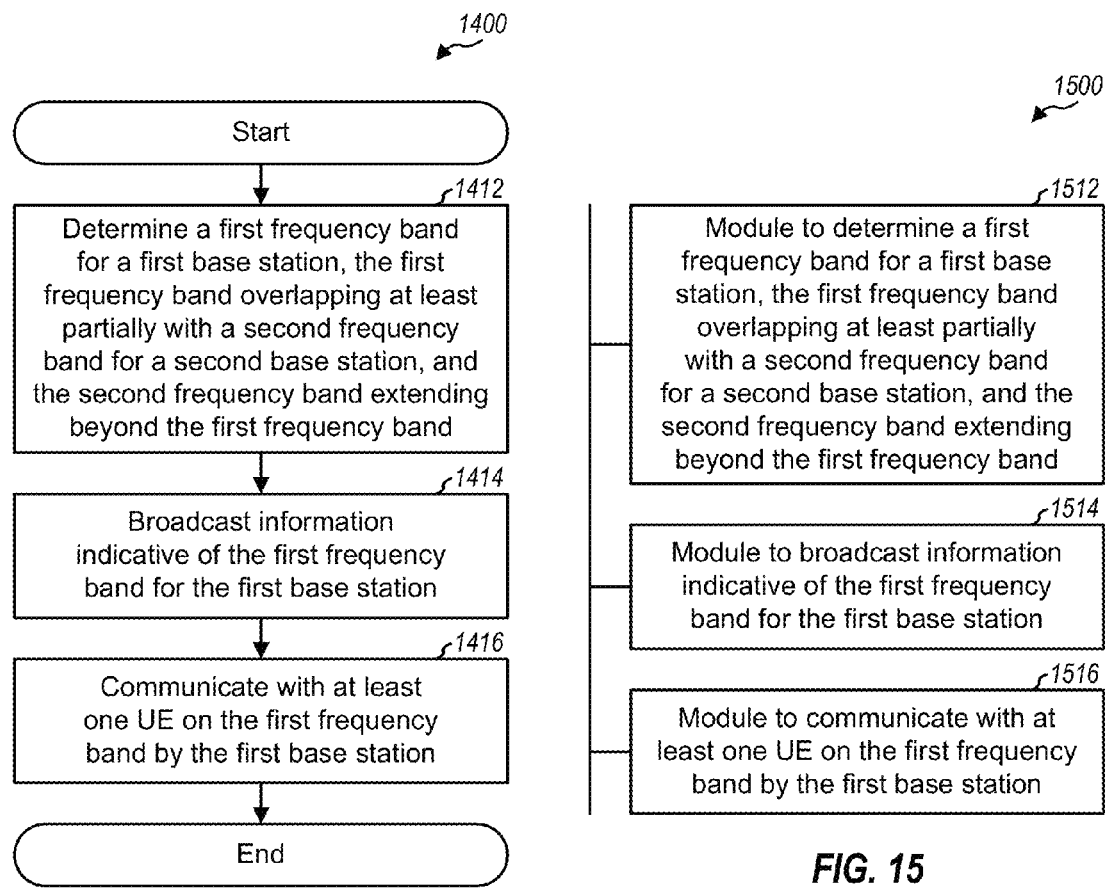
FIG. 14 shows another process performed by a base station.
FIG. 15 shows another apparatus for a base station.

FIG. 14 shows a design of a process 1400 performed by a first base station/eNB for communication with UEs. The first base station (e.g., femto eNB 2 in FIGS. 3 to 5) may determine a first frequency band (e.g., Band 2) for the first base station (block 1412). The first frequency band may overlap at least partially with a second frequency band (e.g., Band 1 in FIGS. 3 to 5) for a second base station (e.g., macro eNB 1), and the second frequency band may extend beyond the first frequency band. The first frequency band may have a smaller bandwidth than the second frequency band and may be completely covered by the second frequency band (e.g., as shown in FIGS. 3 and 5). The first frequency band may also extend beyond the second frequency (e.g., as shown in FIG. 4). The first base station may broadcast information indicative of the first frequency band for the first base station (block 1414). The first base station may also broadcast information indicative of the second frequency band for the second base station. The first base station may communicate with at least one UE on the first frequency band (block 1416).

In one design of block 1416, for communication on the downlink, the first base station may send at least one synchronization signal (e.g., the PSS and SSS) in a center portion of the first frequency band for use by UEs to detect the first base station. The first frequency band may be non-overlapping with a center portion of the second frequency band used by the second base station to send the synchronization signal(s). The first base station may send at least one control channel (e.g., the PCFICH and PHICH) across the first frequency band. The at least one control channel may cause high interference to a portion of the second frequency band for the second base station. The first base station may also send a control channel (e.g., the PDCCH) and/or a data channel (e.g., the PDSCH) in the first frequency band.

In another design of block 1416, for communication on the uplink, the first base station may receive a control channel (e.g., the PUCCH) sent by at least one UE in a control region of the first frequency band. The control region may be non-overlapping with a control region of the second frequency band, e.g., as shown in FIGS. 6 to 9. The first base station may also receive a data channel (e.g., the PUSCH) sent by the at least one UE in a data portion of the first frequency band.

For a restricted association scenario, the first base station may be a femto base station with restricted access, and the second base station may be a macro base station. The first and second base stations may also be other types of base stations in other scenarios.

FIG. 15 shows a design of an apparatus 1500 for a base station. Apparatus 1500 includes a module 1512 to determine a first frequency band for a first base station, with the first frequency band overlapping at least partially with a second frequency band for a second base station, and the second frequency band extending beyond the first frequency band, a module 1514 to broadcast information indicative of the first frequency band for the first base station, and a module 1516 to communicate with at least one UE on the first frequency band by the first base station.

Figure 16:
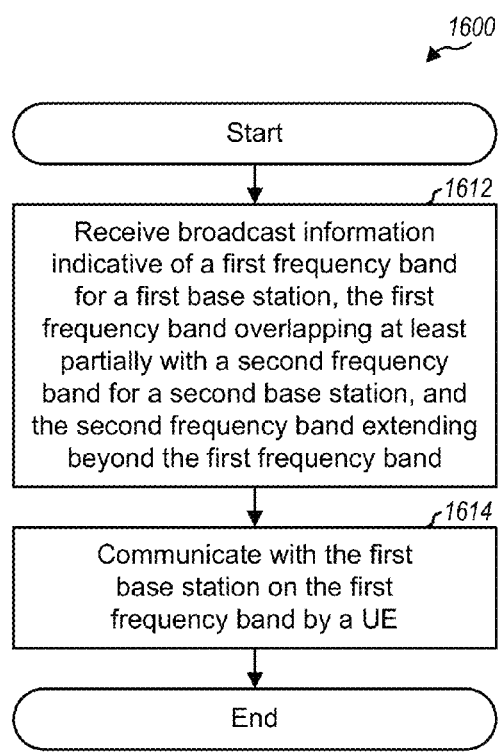
FIG. 16 shows another process performed by a UE.

FIG. 16 shows a design of a process 1600 performed by a UE for communication. The UE may receive broadcast information indicative of a first frequency band (e.g., Band 2 in FIGS. 3 to 5) for a first base station (e.g., femto eNB 2) (block 1612). The first frequency band may overlap at least partially with a second frequency band (e.g., Band 1) for a second base station (e.g., macro eNB 1), and the second frequency band may extend beyond the first frequency band. The UE may communicate with the first base station on the first frequency band (block 1614).

In one design of block 1614, for communication on the downlink, the UE may receive at least one synchronization signal (e.g., the PSS and SSS) sent by the first base station in a center portion of the first frequency band (block 1614). The first frequency band may be non-overlapping with the center portion of the second frequency band used by the second base station to send the synchronization signal(s). The UE may receive at least one control channel (e.g., the PCFICH and PHICH) sent by the first base station across the first frequency band. The at least one control channel may cause high interference to a portion of the second frequency band for the second base station. The UE may also receive a control channel (e.g., the PDCCH) and/or a data channel (e.g., the PDSCH) sent by the first base station in the first frequency band.

In another design of block 1614, for communication on the uplink, the UE may send a control channel (e.g., the PUCCH) to the first base station in a control region of the first frequency band. The control region may be non-overlapping with a control region of the second frequency band, e.g., as shown in FIGS. 6 to 9. The UE may also send a data channel (e.g., the PUSCH) to the first base station in a data portion of the first frequency band.

Figure 17:
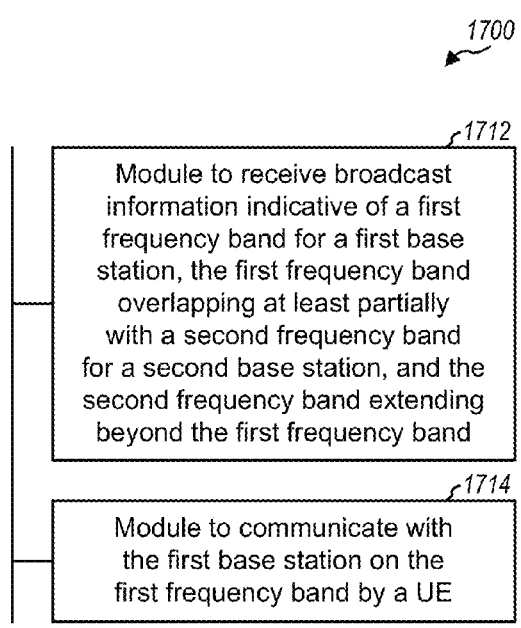
FIG. 17 shows another apparatus for a UE.

FIG. 17 shows a design of an apparatus 1700 for a UE. Apparatus 1700 includes a module 1712 to receive broadcast information indicative of a first frequency band for a first base station, with the first frequency band overlapping at least partially with a second frequency band for a second base station, and the second frequency band extending beyond the first frequency band, and a module 1714 to communicate with the first base station on the first frequency band by the UE.

The modules in FIGS. 11, 13, 15 and 17 may comprise processors, electronics devices, hardware devices, electronics components, logical circuits, memories, software codes, firmware codes, etc., or any combination thereof.

Figure 18:
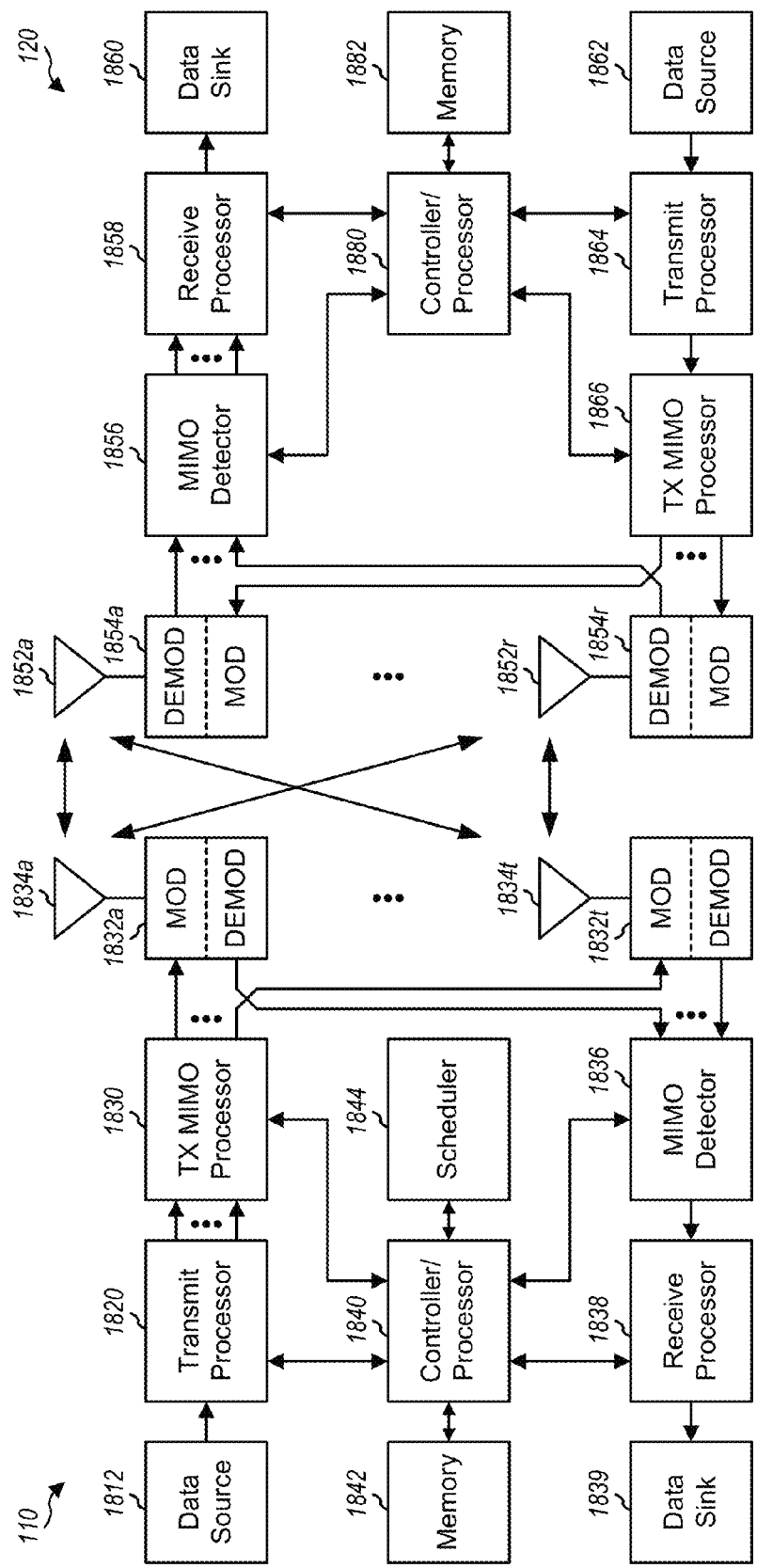
FIG. 18 shows a block diagram of a base station and a UE.

FIG. 18 shows a block diagram of a design of a base station/eNB 110 and a UE 120, which may be one of the base stations/eNBs and one of the UEs in FIG. 1. For a restricted association scenario, base station 110 may be macro eNB 110c in FIG. 1, and UE 120 may be UE 120y. Base station 110 may also be a base station of some other type. Base station 110 may be equipped with T antennas 1834a through 1834t, and UE 120 may be equipped with R antennas 1852a through 1852r, where in general T≥1 and R≥1.

At base station 110, a transmit processor 1820 may receive data from a data source 1812 and control information from a controller/processor 1840. The control information may be for the PBCH, PCFICH, PHICH, PDCCH, etc. The data may be for the PDSCH, etc. Processor 1820 may process (e.g., encode and symbol map) the data and control information to obtain data symbols and control symbols, respectively. Processor 1820 may also generate reference symbols, e.g., for the PSS, SSS, and cell-specific reference signal. A transmit (TX) multiple-input multiple-output (MIMO) processor 1830 may perform spatial processing (e.g., precoding) on the data symbols, the control symbols, and/or the reference symbols, if applicable, and may provide T output symbol streams to T modulators (MODs) 1832a through 1832t. Each modulator 1832 may process a respective output symbol stream (e.g., for OFDM, etc.) to obtain an output sample stream. Each modulator 1832 may further process (e.g., convert to analog, amplify, filter, and upconvert) the output sample stream to obtain a downlink signal. T downlink signals from modulators 1832a through 1832t may be transmitted via T antennas 1834a through 1834t, respectively.

At UE 120, antennas 1852a through 1852r may receive the downlink signals from base station 110 and may provide received signals to demodulators (DEMODs) 1854a through 1854r, respectively. Each demodulator 1854 may condition (e.g., filter, amplify, downconvert, and digitize) a respective received signal to obtain input samples. Each demodulator 1854 may further process the input samples (e.g., for OFDM, etc.) to obtain received symbols. A MIMO detector 1856 may obtain received symbols from all R demodulators 1854a through 1854r, perform MIMO detection on the received symbols if applicable, and provide detected symbols. A receive processor 1858 may process (e.g., demodulate, deinterleave, and decode) the detected symbols, provide decoded data for UE 120 to a data sink 1860, and provide decoded control information to a controller/processor 1880.

On the uplink, at UE 120, a transmit processor 1864 may receive and process data (e.g., for the PUSCH) from a data source 1862 and control information (e.g., for the PUCCH) from controller/processor 1880. Processor 1864 may also generate reference symbols for a reference signal. The symbols from transmit processor 1864 may be precoded by a TX MIMO processor 1866 if applicable, further processed by modulators 1854a through 1854r (e.g., for SC-FDM etc.), and transmitted to base station 110. At base station 110, the uplink signals from UE 120 may be received by antennas 1834, processed by demodulators 1832, detected by a MIMO detector 1836 if applicable, and further processed by a receive processor 1838 to obtain decoded data and control information sent by UE 120. Processor 1838 may provide the decoded data to a data sink 1839 and the decoded control information to controller/processor 1840.

Controllers/processors 1840 and 1880 may direct the operation at base station 110 and UE 120, respectively. Processor 1840 and/or other processors and modules at base station 110 may perform or direct process 1000 in FIG. 10, process 1400 in FIG. 14, and/or other processes for the techniques described herein. Processor 1880 and/or other processors and modules at UE 120 may also perform or direct process 1200 in FIG. 12, process 1600 in FIG. 16, and/or other processes for the techniques described herein. Memories 1842 and 1882 may store data and program codes for base station 110 and UE 120, respectively. A scheduler 1844 may schedule UEs for data transmission on the downlink and/or uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   determining a first frequency band for a first base station, the first frequency band overlapping in frequency at least partially with a second frequency band for a second base station and further extending beyond the second frequency band, and the second frequency band non-overlapping with a center portion of the first frequency band;
   broadcasting information indicative of the first frequency band for the first base station; and
   communicating with at least one user equipment (UE) on the first frequency band by the first base station.

2. The method of claim 1, further comprising:
   broadcasting information indicative of the second frequency band for the second base station.

3. The method of claim 1, wherein the communicating with the at least one UE comprises sending a control channel across the first frequency.

4. The method of claim 1, wherein the communicating with the at least one UE comprises sending multiple transmissions of a control channel across the first frequency band to allow the at least one UE to receive at least one transmission of the control channel without interference from the second base station.

5. The method of claim 1, wherein the communicating with the at least one UE comprises sending a control channel with higher transmit power in a portion of the first frequency band, the portion being non-overlapping with the second frequency band.

6. The method of claim 1, wherein the communicating with the at least one UE comprises sending a control channel to the at least one UE in a selected portion of the first frequency band, the selected portion minimally overlapping the second frequency band.

7. The method of claim 1, further comprising:
   sending a data channel to a UE in a selected portion of the first frequency band, the selected portion being non-overlapping with the second frequency band.

8. The method of claim 1, wherein the communicating with the at least one UE comprises receiving a control channel sent by the at least one UE in a control region of the first frequency band, the control region being non-overlapping with the second frequency band.

9. The method of claim 1, wherein the communicating with the at least one UE comprises receiving a data channel sent by the at least one UE in a data region of the first frequency band, the data region being assignable for data transmission on uplink and non-overlapping with the second frequency band.

10. The method of claim 1, wherein the communicating with the at least one UE comprises avoiding scheduling UEs for data transmission on uplink on the second frequency band.

11. The method of claim 1, wherein the first frequency band has a larger bandwidth than the second frequency band and completely covers the second frequency band.

12. The method of claim 1, wherein the first frequency band comprises a first control region and a first data region, wherein the second frequency band comprises a second control region and a second data region, and wherein the first control region is non-overlapping with the second control region.

13. The method of claim 1, wherein the first base station is a macro base station, and wherein the second base station is a femto base station with restricted access and causing high interference to the at least one UE on downlink.

14. The method of claim 1, wherein the center portion of the first frequency band is used by the first base station for transmitting at least one synchronization signal.

15. The method of claim 14, wherein the determining the first frequency band comprises avoiding interference to the at least one synchronization signal located in the center portion of the first frequency band.

16. An apparatus for wireless communication, comprising:
   means for determining a first frequency band for a first base station, the first frequency band overlapping in frequency at least partially with a second frequency band for a second base station and further extending beyond the second frequency band, and the second frequency band non-overlapping with a center portion of the first frequency band;
   means for broadcasting information indicative of the first frequency band for the first base station; and
   means for communicating with at least one user equipment (UE) on the first frequency band by the first base station.

17. The apparatus of claim 16, wherein the means for communicating with the at least one UE comprises means for sending multiple transmissions of a control channel across the first frequency band to allow the at least one UE to receive at least one transmission of the control channel without interference from the second base station.

18. The apparatus of claim 16, wherein the means for communicating with the at least one UE comprises means for sending a control channel or a data channel to the at least one UE in a portion of the first frequency band, the portion being non-overlapping with the second frequency band.

19. An apparatus for wireless communication, comprising at least one processor configured to
   determine a first frequency band for a first base station, the first frequency band overlapping in frequency at least partially with a second frequency band for a second base station and further extending beyond the second frequency band, and the second frequency band non-overlapping with a center portion of the first frequency band,
   broadcast information indicative of the first frequency band for the first base station, and
   communicate with at least one user equipment (UE) on the first frequency band by the first base station.

20. The apparatus of claim 19, wherein the at least one processor is configured to send multiple transmissions of a control channel across the first frequency band to allow the at least one UE to receive at least one transmission of the control channel without interference from the second base station.

21. The apparatus of claim 19, wherein the at least one processor is configured to send a control channel or a data channel to the at least one UE in a portion of the first frequency band, the portion being non-overlapping with the second frequency band.

22. A non-transitory computer-readable medium storing computer executable code for wireless communication, comprising code for:
   determining a first frequency band for a first base station, the first frequency band overlapping in frequency at least partially with a second frequency band for a second base station and further extending beyond the second frequency band, and the second frequency band non-overlapping with a center portion of the first frequency band,
   broadcasting information indicative of the first frequency band for the first base station, and
   communicating with at least one user equipment (UE) on the first frequency band by the first base station.

23. A method for wireless communication, comprising:
   receiving broadcast information indicative of a first frequency band for a first base station, the first frequency band overlapping in frequency at least partially with a second frequency band for a second base station and further extending beyond the second frequency band, and the second frequency band non-overlapping with a center portion of the first frequency band; and
   communicating with the first base station on the first frequency band by a user equipment (UE).

24. The method of claim 23, wherein the communicating with the first base station comprises receiving a control channel or a data channel sent by the first base station to the UE in a portion of the first frequency band, the portion being non-overlapping with the second frequency band.

25. The method of claim 23, wherein the communicating with the first base station comprises sending a control channel to the first base station in a control region of the first frequency band, the control region being non-overlapping with the second frequency band.

26. The method of claim 23, wherein the communicating with the first base station comprises sending a data channel to the first base station in a data region of the first frequency band, the data region being assignable for data transmission on uplink and non-overlapping with the second frequency band.

27. The method of claim 23, wherein the first frequency band has a larger bandwidth than the second frequency band and completely covers the second frequency band.

28. The method of claim 23, wherein the first base station is a macro base station, and wherein the second base station is a femto base station with restricted access and observing high interference from the UE on uplink.

29. The method of claim 23, wherein the center portion of the first frequency band is used by the first base station for transmitting at least one synchronization signal.

30. The method of claim 29, wherein interference to the at least one synchronization signal located in the center portion of the first frequency band is avoided.

31. An apparatus for wireless communication, comprising:
   means for receiving broadcast information indicative of a first frequency band for a first base station, the first frequency band overlapping in frequency at least partially with a second frequency band for a second base station and further extending beyond the second frequency band, and the second frequency band non-overlapping with a center portion of the first frequency band; and
   means for communicating with the first base station on the first frequency band by a user equipment (UE).

32. The apparatus of claim 31, wherein the means for communicating with the first base station comprises means for receiving a control channel or a data channel sent by the first base station to the UE in a portion of the first frequency band, the portion being non-overlapping with the second frequency band.

33. An apparatus for wireless communication, comprising at least one processor configured to
   receive broadcast information indicative of a first frequency band for a first base station, the first frequency band overlapping in frequency at least partially with a second frequency band for a second base station and further extending beyond the second frequency band, and the second frequency band non-overlapping with a center portion of the first frequency band; and
   communicate with the first base station on the first frequency band by a user equipment (UE).

34. A non-transitory computer-readable medium storing computer executable code for wireless communication, comprising code for:
   receiving broadcast information indicative of a first frequency band for a first base station, the first frequency band overlapping in frequency at least partially with a second frequency band for a second base station and further extending beyond the second frequency band, and the second frequency band non-overlapping with a center portion of the first frequency band; and
   communicating with the first base station on the first frequency band by a user equipment (UE).

35. A method for wireless communication, comprising:
   determining a first frequency band for a first base station, the first frequency band overlapping in frequency at least partially with a second frequency band for a second base station, the second frequency band extending beyond the first frequency band, and the first frequency band non-overlapping with a center portion of the second frequency band;
   broadcasting information indicative of the first frequency band for the first base station; and communicating with at least one user equipment (UE) on the first frequency band by the first base station.

36. The method of claim 35, further comprising: broadcasting information indicative of the second frequency band for the second base station.

37. The method of claim 35, wherein the communicating with the at least one UE comprises sending at least one control channel across the first frequency band, the at least one control channel causing high interference to a portion of the second frequency band for the second base station.

38. The method of claim 35, wherein the first frequency band has a smaller bandwidth than the second frequency band and is completely covered by the second frequency band.

39. The method of claim 35, wherein the first base station is a femto base station and the second base station is a macro base station.

40. The method of claim 35, wherein the center portion of the second frequency band is used by the second base station for transmitting at least one synchronization signal.

41. The method of claim 40, wherein the determining the first frequency band comprises avoiding interference to the at least one synchronization signal located in the center portion of the second frequency band.

42. An apparatus for wireless communication, comprising:
means for determining a first frequency band for a first base station, the first frequency band overlapping in frequency at least partially with a second frequency band for a second base station, the second frequency band extending beyond the first frequency band, and the first frequency band non-overlapping with a center portion of the second frequency band;
means for broadcasting information indicative of the first frequency band for the first base station; and
means for communicating with at least one user equipment (UE) on the first frequency band by the first base station.

43. An apparatus for wireless communication, comprising at least one processor configured to
determine a first frequency band for a first base station, the first frequency band overlapping in frequency at least partially with a second frequency band for a second base station, the second frequency band extending beyond the first frequency band, and the first frequency band non-overlapping with a center portion of the second frequency band;
broadcast information indicative of the first frequency band for the first base station; and
communicate with at least one user equipment (UE) on the first frequency band by the first base station.

44. A non-transitory computer-readable medium storing computer executable code for wireless communication, comprising code for:
determining a first frequency band for a first base station, the first frequency band overlapping in frequency at least partially with a second frequency band for a second base station, the second frequency band extending beyond the first frequency band, and the first frequency band non-overlapping with a center portion of the second frequency band;
broadcasting information indicative of the first frequency band for the first base station; and
communicating with at least one user equipment (UE) on the first frequency band by the first base station.

45. A method for wireless communication, comprising:
receiving broadcast information indicative of a first frequency band for a first base station, the first frequency band overlapping in frequency at least partially with a second frequency band for a second base station, the second frequency band extending beyond the first frequency band, and the first frequency band non-overlapping with a center portion of the second frequency band; and
communicating with the first base station on the first frequency band by a user equipment (UE).

46. The method of claim 45, wherein the communicating with the first base station comprises receiving at least one control channel sent by the first base station across the first frequency band, the at least one control channel causing high interference to a portion of the second frequency band for the second base station.

47. The method of claim 45, wherein the center portion of the second frequency band is used by the second base station for transmitting at least one synchronization signal.

48. The method of claim 47, wherein interference to the at least one synchronization signal located in the center portion of the second frequency band is avoided.

49. An apparatus for wireless communication, comprising:
means for receiving broadcast information indicative of a first frequency band for a first base station, the first frequency band overlapping in frequency at least partially with a second frequency band for a second base station, the second frequency band extending beyond the first frequency band, and the first frequency band non-overlapping with a center portion of the second frequency band; and
means for communicating with the first base station on the first frequency band by a user equipment (UE).

50. An apparatus for wireless communication, comprising at least one processor configured to
receive broadcast information indicative of a first frequency band for a first base station, the first frequency band overlapping in frequency at least partially with a second frequency band for a second base station, the second frequency band extending beyond the first frequency band, and the first frequency band non-overlapping with a center portion of the second frequency band; and
communicate with the first base station on the first frequency band by a user equipment (UE).

51. A non-transitory computer-readable medium storing computer executable code for wireless communication, comprising code for:
receiving broadcast information indicative of a first frequency band for a first base station, the first frequency band overlapping in frequency at least partially with a second frequency band for a second base station, the second frequency band extending beyond the first frequency band, and the first frequency band non-overlapping with a center portion of the second frequency band; and
communicating with the first base station on the first frequency band by a user equipment (UE).

* * * * *